(12) United States Patent
Lamb, III

(10) Patent No.: US 7,840,432 B2
(45) Date of Patent: Nov. 23, 2010

(54) COMMODITIES COST ANALYSIS DATABASE

(75) Inventor: Gilbert C. Lamb, III, Navarre, FL (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 11/614,718

(22) Filed: Dec. 21, 2006

(65) Prior Publication Data

US 2008/0154755 A1 Jun. 26, 2008

(51) Int. Cl.
*G06F 17/50* (2006.01)
*G06F 19/00* (2006.01)

(52) U.S. Cl. .................. 705/7; 705/8; 700/95; 700/97; 700/98

(58) Field of Classification Search ............. 702/81–83, 702/179, 182, 183, 184; 705/400, 7, 8, 30, 705/32; 714/1, 25, 26, 37; 701/29, 30, 35; 340/457.4; 700/95, 97, 98
See application file for complete search history.

(56) References Cited

U.S. PATENT DOCUMENTS

| | | | |
|---|---|---|---|
| 4,383,298 A * | 5/1983 | Huff et al. ..................... 705/28 |
| 5,970,476 A | 2/1999 | Fahey | |
| 6,393,406 B1 | 5/2002 | Eder | |
| 6,505,106 B1 * | 1/2003 | Lawrence et al. ............. 701/35 |
| 6,532,426 B1 * | 3/2003 | Hooks et al. .................. 702/81 |
| 7,065,420 B1 * | 6/2006 | Philpott et al. ................ 700/97 |
| 7,107,491 B2 * | 9/2006 | Graichen et al. .............. 714/37 |
| 7,149,739 B1 * | 12/2006 | Dose et al. ......................... 1/1 |
| 7,206,771 B2 * | 4/2007 | Alvarez et al. ................ 706/45 |
| 7,558,639 B2 * | 7/2009 | Rassaian et al. ............... 700/98 |
| 2004/0034555 A1 * | 2/2004 | Dismukes et al. .............. 705/7 |
| 2005/0065842 A1 * | 3/2005 | Summers ..................... 705/11 |
| 2006/0089920 A1 * | 4/2006 | Ramesh et al. .............. 705/400 |

FOREIGN PATENT DOCUMENTS

JP 2001119801 * 4/2001

* cited by examiner

*Primary Examiner*—Igor Borissov
(74) *Attorney, Agent, or Firm*—Yee & Associates, P.C.; John A. Lepore

(57) ABSTRACT

A computer implemented method and computer program product for managing commodity data. In one or more embodiments, a commodity type and parts corresponding to the commodity are identified. A part cost analysis is generated for each part based on part history data. The part history data is obtained from a set of data sources using data mining techniques to filter relevant part data from a plurality of part data. Cost-related failure data is created using the part cost data and the keyed hierarchical breakdown coding sequence. The cost-related failure data is displayed in a commodity database based on the keyed hierarchical breakdown coding sequence. A user can obtain information regarding future cost trends for the commodity and corresponding parts based on a demand for the commodity and a demand for the parts.

20 Claims, 17 Drawing Sheets

*FIG. 3*

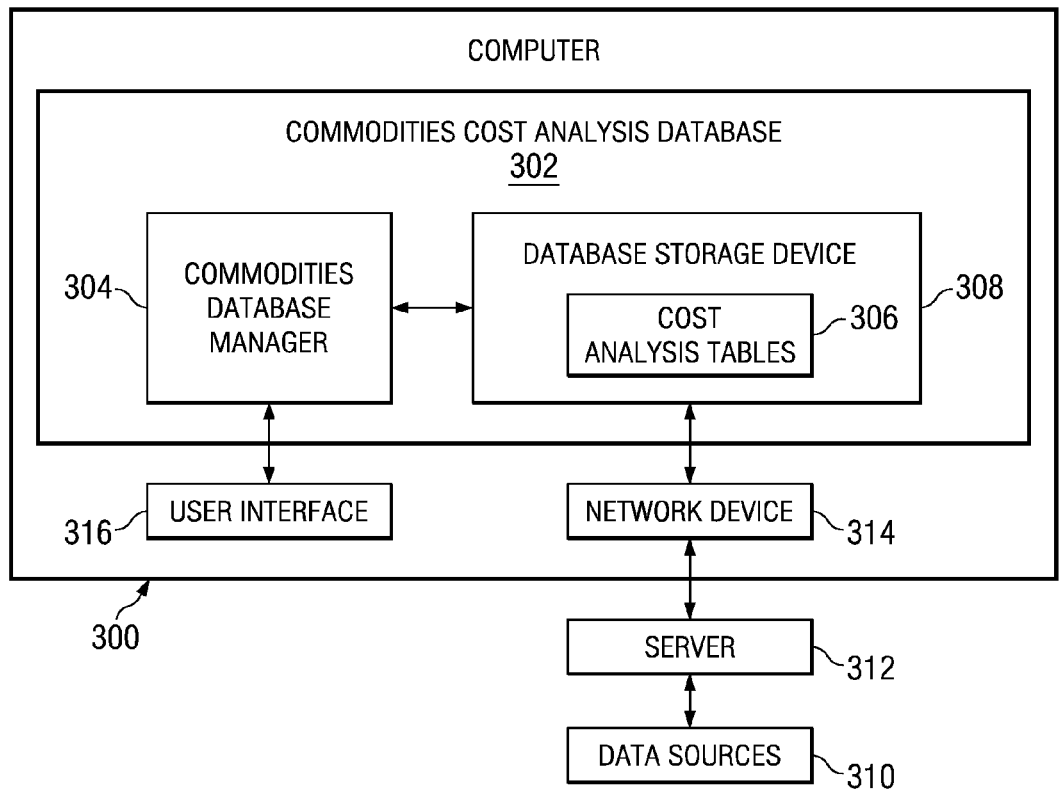

| | |
|---|---|
| 11 | AIRFRAME |
| 12 | COCKPIT AND FUSELAGE |
| 13 | LANDING GEAR |
| 14 | FLIGHT CONTROL |
| 15 | HELICOPTER ROTOR SYSTEM |
| 16 | ESCAPE CAPSULE |
| 17 | AERIAL RECOVERY SYSTEM |
| 18 | VERTICAL OR SHORT TAKEOFF AND LANDING (V/STOL) POWER AND CONTROL TRANSMISSION SYSTEM |
| 19 | ENGINE STARTING CONTROL |
| ⋮ | ⋮ |
| 59 | CREW COMMUNICATIONS |
| 60 | VERY LOW FREQUENCY/LOW FREQUENCY (VL/LF) COMMUNICATIONS |
| 61 | HIGH FREQUENCY (HF) COMMUNICATIONS ⁓502 |
| 62 | VERY HIGH FREQUENCY (VHF) COMMUNICATIONS |
| 63 | ULTRA HIGH FREQUENCY (UHF) COMMUNICATIONS |

| FY 2005 Failures by MDS | | | |
|---|---|---|---|
| MDS | NSN | NOMENCLATURE | FAILURES |
| A/C-CU | 5821011555555 | CONTROL, RADIO SET | 1 |
| A/C-CU | 5985011242424 | COUPLER ANTENNA | 54 |
| A/C-CU | 5985011484848 | COUPLER ANTENNA | 17 |
| A/C-CU | 5821011818188 | RECEIVER-TRANSMITTE | 83 |

61A AN/ABC-123 RADIO, HIGH FREQUENCY (HF) COMMUNICATIONS SUMMARY — 902

| REF | MAIN PARTS | TCC (904) | NRTS COST (908) | NET COST (906) |
|---|---|---|---|---|
| 1T | RADIO RECEIVER-TRANSMITTER DE-134(V)5/ABQ-123 | $1,634,226 | $1,111,261 | $1,114,766 |
| 1W | RADIO RECEIVER-TRANSMITTER DE-134(V)8/ABQ-123 | $1,290,765 | $868,419 | $958,583 |
| 3B | ANTENNA COUPLER QA-2275(V)2 | $655,874 | $461,117 | $446,491 |
| 3A | ANTENNA COUPLER QA-2275(V)1 | $653,829 | $442,727 | $457,387 |
| 3C | ANTENNA COUPLER QA-2275(V)3 | $530,664 | $282,788 | $287,917 |

Years: 98 99 00 01 02 03 04 05 06 07

910

>3-Year Avg Increase: Sales Qty ▢  Net Cost ▢  NRTS Cost ▢

| SELECTED MAIN PART NUMBERS — 1002 | CAGE | RN CC | RN VC |
|---|---|---|---|
| 6CC-F956-00F | 13499 | C | 1 |
| 6CC-598F-00A | 13499 | 3 | 2 |
| AF AVIONICS S/P IL | 1HBK | 8 | 1 |
| RTAEF1V5ARC190F | 80058 | 5 | 1 |
| RT-AEF1(V)5/ABC-123 — 1004 | 80058 | 5 | 1 |

Common Name and Notes 5821-01-286-8686

RADIO RECEIVER-TRANSMITTER DE-1341V()5/ABQ-123

Common Name: RECEIVER-TRANSMITTER

Notes:

| | Single NSN Costs | Single NSN Detailed Costs | Costs with Related Detailed NSNs | All Flight Hours and NSN Failures | Costs Estimate for ROI | | | | | | |
|---|---|---|---|---|---|---|---|---|---|---|---|
| FY | Sales | Credits | NRTS | Net | Standard Avg Price | Markup Avg Price | Exchange Avg Price | Total Charge Cost | Total Credit Cost | NRTS Cost | Net Cost |
| '98 | 142 | 30 | 7 | 113 | $30,009 | $26,922 | $3,155 | $491,261 | $127,883 | $23,051 | $363,378 |
| '99 | 335 | 72 | 241 | 263 | $29,345 | $25,262 | $4,092 | $1,439,146 | $345,076 | $979,776 | $1,094,070 |
| '00 | 293 | 65 | 193 | 233 | $50,443 | $45,184 | $5,259 | $1,611,095 | $342,088 | $1,014,488 | $1,269,007 |
| '01 | 347 | 62 | 263 | 285 | $53,755 | $50,849 | $2,905 | $1,160,649 | $278,916 | $764,065 | $881,734 |
| '02 | 442 | 72 | 353 | 371 | $49,525 | $47,121 | $2,404 | $1,161,724 | $349,288 | $848,616 | $812,435 |
| '03 | 437 | 78 | 341 | 360 | $48,231 | $45,762 | $2,469 | $1,127,285 | $272,813 | $842,007 | $854,472 |
| '04 | 397 | 82 | 303 | 315 | $47,485 | $42,804 | $4,682 | $1,984,829 | $326,776 | $1,418,552 | $1,658,053 |
| '05 | 271 | 70 | 183 | 202 | $68,042 | $63,297 | $4,745 | $1,290,765 | $332,182 | $868,419 | $958,583 |
| '06 | 218 | 44 | 172 | 174 | $70,771 | $65,107 | $5,664 | $1,233,731 | $249,195 | $974,127 | $984,536 |

COMMODITIES COST ANALYSIS DATABASE

BACKGROUND INFORMATION

1. Field of Invention

The present invention relates generally to an improved data processing system and in particular to a database model. Still more particularly, the present invention relates to a computer implemented method and computer usable program code to generate, organize, manipulate and analyze data in a relational database for managing and improving equipment long-term supportability.

2. Background Description

A commodity frequently has multiple parts. Each of these parts may require repair, replacement, and/or redesign during various phases of the commodity's useable life cycle. As used herein, a commodity includes, but is not limited to, any type of equipment or machine, such as an airplane, car, boat, truck, van, construction vehicle, forklift, computer hardware, radar equipment, engine, transmission, or any other equipment having one or more repairable parts.

To improve commodity operation and supportability, as well as to identify commodity part improvement candidates, a user may need to compare the costs of maintenance, repair, and replacement of all the commodity parts and related subparts. To determine which part in a commodity is driving costs, a user needs to identify parts that are responsible for the greatest share of repair and maintenance costs. In other words, the user needs to identify parts that are driving the commodity's maintenance and repair costs. These parts are referred to as cost driver parts.

A user can manually identify cost driver parts for a given commodity by comparing the cost of repair and maintenance of the subparts. A user may then attempt to manually determine whether continued repair of a given cost driver part is more cost effective than replacement or redesign of the part or subparts. A user may make this determination by comparing the costs of repairing with the costs for replacing the part with an identical part, replacing the part with an alternative part, or redesign of the part or replacement parts. This comparison of the various costs associated with the cost driver part allows a user to determine which option is the most cost effective and/or will yield the best return on investment (ROI).

To make a return on investment determination, however, a user must identify cost driver parts. Typically, a user will identify cost driver parts based on the greatest current costs for repair and/or replacement of the parts. The user then makes a manual search through all part history cost data and part maintenance and repair records to obtain past and current cost data associated with the cost driver parts. The user obtains and compares current part costs for repair and replacement where the cost driver part is used within the commodity. The user also obtains and compares part reuse in different functional areas of the commodity, costs for alternate parts, and costs associated with any previous part configurations, such as historical part redesigns.

This process is both difficult and time consuming for users because the user is required to sort through voluminous part information and data sources in an attempt to manually locate relevant information of interest. If a user cannot locate all the desired part cost information, the user may be unable to manually calculate the past and current costs for repairing and replacing the given part. If a user cannot calculate accurate past and current costs, the user may be unable to make a meaningful determination as to whether continued repair, redesign, or replacement of the part may be most cost effective. This process may also be inaccurate or misleading when a user has incomplete part cost data, or incorrectly calculates past or current costs associated with maintenance, repair, and replacement of the part.

In addition, this process only provides the user with information regarding a single part. If the user wishes to obtain data regarding costs for repair and replacement for another part-related to the cost driver part or a subpart, the user must repeat the time consuming and arduous process of manually searching available data sources for part cost data relating to the new part or subpart, and manually calculate the past and current cost for repair, replacement, or redesign of the parts and subparts.

Finally, this process only permits a user to obtain cost information for past and current repairs and replacement costs. This process does not provide any information regarding future cost projections for maintenance, repair, and replacement of parts and subparts. Thus, a user is frequently unable to make an accurate determination as to whether a repair, replacement, or redesign of a given cost driver part or subpart will provide the best future return on investment.

Therefore, it would be advantageous to have an improved computer implemented method and computer usable program code to provide a commodity part database to organize and present commodity part data to a user for managing and improving commodity supportability over a commodity's projected life cycle.

SUMMARY OF THE INVENTION

Advantageous embodiments of the present invention provide a computer implemented method for managing aircraft fleet maintenance and logistics. In one or more embodiments, a set of cost driver parts corresponding to an aircraft type commodity is identified based on part history data. The part history data is obtained by using data mining techniques to filter relevant part data from a set of data sources. A commodities cost analysis database is populated with cost-related part failure data and part configuration data for the set of cost driver subparts based on maintenance and supply data from the set of data sources. Estimated future repair costs for the set of cost driver subparts are computed. The estimated future repair costs, cost-related part failure data, and configuration data is displayed in the commodities cost analysis database. The commodities cost analysis database is used to examine equipment health of a commodity.

Advantageous embodiments of the present invention also provide a computer implemented method and computer usable program code for a commodity cost analysis database. In one or more embodiments, a computer implemented method is provided for managing commodity data. A commodity type and parts associated with the commodity are identified. A part cost analysis is generated for each part based on part history data. Part history data includes historical demand, cost, and usage data for a part. The part history data is obtained from a set of data sources using data mining techniques to filter relevant part data from a plurality of part data. Cost-related failure data is created using the part cost data and the keyed hierarchical breakdown coding sequence. The cost-related failure data in the commodity database is displayed based on the keyed hierarchical breakdown coding sequence. A user can obtain information regarding future cost trends for the commodity and corresponding subparts based on demand, repairs, and costs for the commodity parts and subparts.

In another illustrative embodiment, a computer program product having computer usable program code encompasses the steps for managing commodity data. The computer program product is executed to perform the steps in the method.

The features, functions, and advantages can be achieved independently in various embodiments of the present invention, or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 3 is a diagram of a data flow through a commodities cost analysis database for presenting commodity part data to a user in accordance with an advantageous embodiment of the present invention;

FIG. 5 is an exemplary two-digit commodities code table in accordance with an advantageous embodiment of the present invention;

FIG. 9 is a diagram of a main parts display for a selected commodity in accordance with an advantageous embodiment of the present invention;

FIG. 10 is a diagram of a listing of manufacturer part numbers for a selected main part in accordance with an advantageous embodiment of the present invention;

FIG. 11 is a diagram of a screen providing additional information as to a field in a listing of manufacturer part numbers for a selected part in accordance with an advantageous embodiment of the present invention;

FIG. 17 is a diagram illustrating a cost with related NSN tab display screen in accordance with an advantageous embodiment of the present invention;

FIG. 18 is a diagram illustrating all flight hours and NSN failures tab display screen in accordance with an advantageous embodiment of the present invention;

DETAILED DESCRIPTION OF THE INVENTION

Figure 1:
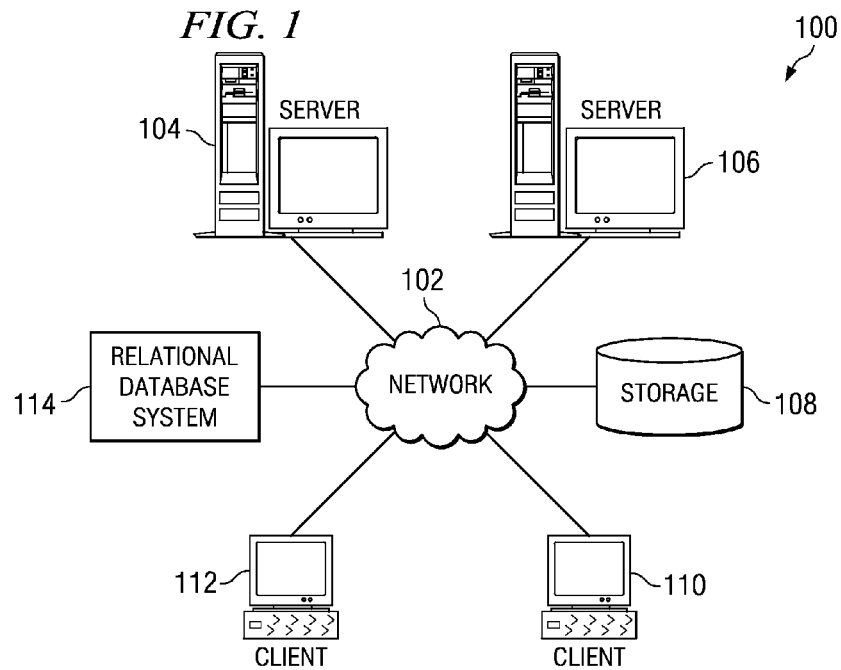
FIG. 1 is an exemplary diagram of a data processing environment in which an advantageous embodiment of the present invention may be implemented.

With reference now to the figures and in particular with reference to FIG. 1, an exemplary diagram of a data processing environment is provided in which advantageous embodiments may be implemented. It should be appreciated that FIG. 1 is only exemplary and is not intended to assert or imply any limitation with regard to the environment in which different embodiments may be implemented. Many modifications to the depicted environment may be made.

FIG. 1 depicts an exemplary diagram of a data processing environment in which an advantageous embodiment of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 and relational database system 114 connect to network 102. Clients 110 and 112 may be, for example, personal computers or network computers. Clients 110 and 112 are clients to server 104 in this example.

Relational database system 114 includes one or more databases for performing functions such as storing, receiving, sorting, querying, organizing, and/or manipulating part cost data. Part cost data is data regarding the costs for producing, designing, maintaining, operating, repairing, replacing, and/or redesigning a part or subpart. In other words, part cost data is any data regarding a cost associated with a given part. The part cost data may be obtained from one or more data sources.

In these examples, relational database system 114 includes one or more relational databases; however, relational database system 114 also may include databases that are not relational databases. Relational database system 114 also includes a commodities cost analysis database in accordance with the illustrative embodiments.

As used herein, a commodity is a repairable equipment or component having one or more parts. Each part in a commodity can include one or more subparts. Each subpart in a part can also include one or more sub-subparts as well. For example, the term commodity can be used to refer to an airplane, as well as a radio that is installed or to be installed inside the airplane.

The term "subpart" refers to a part, piece, or constituent of a commodity or another part. A subpart may have one or more subparts of its own, which can be referred to as sub-subparts. A sub-subpart may also have subparts, and so forth. Each of the parts, subparts, and sub-subparts of a commodity may require maintenance, repair, replacement, or redesign during the life cycle of the commodity. As used herein, the term part may include a part, subpart, sub-subpart, or any piece or constituent of a part, subpart, or sub-subpart.

In the advantageous embodiments, a user queries the commodities cost analysis database within relational database system 114 for information regarding past, present, and projected future costs for maintenance, repair, design, redesign, and/or replacements of commodities, as well as the parts, subparts, and sub-subparts associated with a commodity. Relational database system 114 provides part cost data as output to computer, such as client 110 and client 112 in response to a user request or query.

In the depicted example, network data processing system 100 is the Internet with network 102 representing a worldwide collection of networks and gateways that use the Transmission Control Protocol/Internet Protocol (TCP/IP) or similar suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an Intranet, a local area network (LAN), or a wide area network (WAN). FIG. 1 is intended as an example, and not as an architectural limitation for different embodiments.

The different processes for the advantageous embodiments of the present invention may be implemented in a server, client, or combination of server and client computers. For example, the processes and data may be located at a single client, such as client 110, alternatively, the processes for providing the simulations may be located on a server, such as server 104 with the client containing a process for providing user input and presenting output, such as through a browser program. The different processes for the advantageous embodiments of the present invention may also be implemented in any database system, such as relational database system 114 connected to a network, a server, a client, or combinations of server and client computers. In addition, network data processing system 100 may include additional servers, clients, databases, data storage devices, and other devices not shown in FIG. 1.

Figure 2:
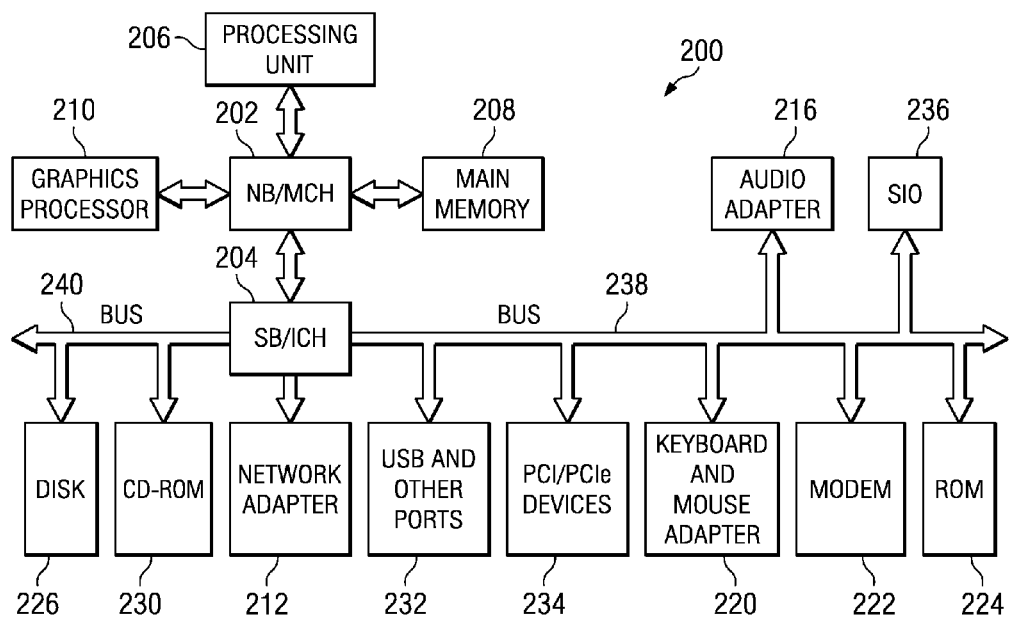
FIG. 2 is a diagram of a data processing system in accordance with an advantageous embodiment of the present invention.

Turning now to FIG. 2, a diagram of a data processing system is depicted in accordance with an advantageous embodiment of the present invention in the processor unit. Data processing system 200 is an example of a data processing system that may be used to implement different processes for an advantageous embodiment of the present invention.

Data processing system 200 may be used to implement different computers, such as, for example, client 110 or server 104 in FIG. 1. In this illustrative example, communications fabric 202 provides communications between processor unit 204, memory 206, persistent storage 208, communications unit 210, I/O unit 212, and display 214. Communications fabric 202 in these examples takes the forms of a bus. Of course, communications fabric 202 may take any form that provides communications between the different components of data processing system 200.

Processor unit 204 executes instructions for software that may be loaded into memory 206. Processor unit 204 may be a set of one or more processors or may be a multi-processor core depending on the particular implementation. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system, the object-oriented programming system, and applications or programs are located on persistent storage 208. These instructions and may be loaded into memory 206 for execution by processor unit 204. The processes of the illustrative embodiments may be performed by processor unit 204 using computer implemented instructions, which may be located in a memory, such as memory 206.

In another illustrative embodiment, a computer implemented method for managing aircraft fleet maintenance and logistics is provided. The process identifies a set of cost driver subparts corresponding to an aircraft type commodity based on part data obtained by using data mining techniques to filter relevant part data from a plurality of data sources. The process populates a commodity database to display cost-related failure data and inherit configurations for the commodity based on maintenance and supply data from a set of data sources. The process computes an estimated future repair cost for the set of cost driver subparts in the commodity database. The commodity database is used to examine equipment health of the commodity.

Equipment health refers to the reliability, general condition, operability, and/or soundness of a commodity or one of the commodity's parts. Equipment health reflects the maintenance, repair, design, redesign, and/or replacement of the commodity and the commodities parts. For example, if maintenance, repair and replacement of a commodity and/or the commodity's parts are infrequently required to maintain the commodity in an operable state, the equipment health may be considered very good. However, equipment health may be considered poor where frequent maintenance and repair of parts is necessary to maintain the commodity in good working condition. When overall equipment health is poor, a redesign or replacement of one or more parts may be necessary to reduce the number of repairs.

Advantageous embodiments of the present invention also provide a computer implemented method and computer usable program code for a commodity cost analysis database. In one illustrative embodiment, a computer implemented method is provided for managing commodity data. The process identifies a commodity type, part, and subpart. A part cost analysis is generated for each part and subpart based on historical demand, cost, and usage data. The part history data is obtained from a set of data sources using data mining techniques to filter relevant part data from a plurality of previously unrelated data. The process sorts part cost data based on a keyed hierarchical breakdown coding sequence within a relational database to organize cost-related failure data. The cost-related failure data in the commodity database is displayed based on the keyed hierarchical breakdown coding sequence. A user can obtain information regarding future cost trends for the commodity and corresponding subparts based on demand, repairs, and costs for the commodity parts and subparts.

Part cost data is data regarding the cost of a particular part. Data mining is used to pull part cost data from a number of different cost elements in a set of data sources.

The commodities cost analysis database sorts the part cost data based on a keyed hierarchical breakdown coding sequence within a relational database to form cost-related failure data. The keyed hierarchical breakdown coding sequence is a top-down hierarchical breakdown sequence of parts and subparts within a commodity or piece of equipment. For example, an airplane includes seats. Each seat has subparts such as a head rest and seat cushions. The head rest has subparts, such as padding and upholstery. In a top-down hierarchy, the sequence of part relationships for the padding could include airplane, passenger seat, head rest on the seat, and padding in the head rest because the padding is included in the higher assembly head rest which is included in the higher assembly passenger seat, and so forth.

The cost-related failure data in the commodities cost analysis database is calculated or determined based on the keyed hierarchical coding sequence. Cost-related failure data includes, but is not limited to, data regarding the relationship of the part in the hierarchy of assemblies and subassemblies in a given commodity and/or the relationships between two or more parts within the commodity. Cost-related failure data also includes the costs of maintenance, repair, redesign and/or replacement of a given part in relationship to the costs associated with the next higher assembly and/or the cost of related parts within the assembly. In this manner, a user can compare not only the cost of an individual part, but the cost of the next higher assembly in which the part is included and the costs of one or more other related or dependent parts.

The cost-related failure data is displayed to a user by the commodities cost analysis database based on the keyed hierarchical breakdown coding sequence. A user can query the commodities cost analysis database to obtain information regarding past, present, and future cost trends for the commodity and corresponding subparts based on a demand for the commodity and a demand for the subparts.

As used herein, a cost driver part or cost driver subpart is a part that drives costs associated with a commodity. A cost driver part is a main factor that causes costs associated with the commodity to be incurred by operation and maintenance of the commodity. In one embodiment, cost driver subparts are parts that are repairable and not disposable. In other words, cost driver subparts may be parts of significant repair and/or replacement cost rather than low-cost disposable parts. Cost driver subparts also include parts that have multiple installed locations and functions within a commodity. Cost driver subparts may also include parts that are used in multiple different configurations or variants of the commodity.

The process of this illustrative embodiment populates a commodity cost analysis database to provide information to a user about cost-related failure data and other inherit configurations for the commodity based on maintenance and supply data from a set of data sources. The process identifies an estimated future repair cost for the set of cost driver subparts in the commodity database. The commodity database is used to examine equipment health of the commodity. In other words, the commodities cost analysis database filters part cost data for repairable parts and ranks the parts in accordance with the costs of maintenance, repair, design, redesign, and/or replacement of the repairable parts.

FIG. 3 is a diagram of a data flow through a commodities cost analysis database for presenting commodity part data to a user in accordance with an advantageous embodiment of the present invention. Computer 300 may be implemented using any type of computing device, such as a personal computer, laptop, personal digital assistant, or any other computing device depicted in FIGS. 1 and 2.

Commodities cost analysis database 302 is a relational database for tracking multiple configurations of a commodity and component part relationships to all commodity configurations. Commodities cost analysis database 302 identifies cost driver parts associated with a commodity, parts used on other configurations of the commodity, and all related commodity configurations using the identified cost driver parts. For example, if the commodity is a radio in an airplane, commodities cost analysis database 302 identifies subparts in the radio that drive the cost of repairs and maintenance on the radio. The subparts that drive repair and maintenance costs are referred to as cost driver subparts.

In this example, commodities cost analysis database 302 also identifies all other commodities on the aircraft that use the cost driver subparts associated with the radio. In addition, commodities cost analysis database 302 can identify all other aircraft that use the radio and/or cost driver subparts. Using this information, a user is able to make cost savings, or future cost avoidance improvements, associated with the identified cost driver subparts.

Commodities cost analysis database 302 includes commodities database manager 304. Commodities database manager 304 is a software database manager for managing, organizing, manipulating, analyzing and presenting part cost data and cost-related failure data associated with past, present, and projected future maintenance, repair, and replacement costs for one or more parts.

Part cost data includes, for example, data identifying parts by part number, type of repairs, cost of repairs, subparts, sub-subparts of a given part, alternative or replacement parts for a given part, commodities using the given part, operating hours in which a given part is used, initial cost of the new part, cost of a repaired part, credits for successful repair of a given part, cost of designing a new part or redesigning a given part, historical maintenance, repair and replacement costs, current costs, projected future costs, and/or any other data regarding a part.

Commodities database manager 304 uses data mining techniques to obtain part cost data regarding a commodity or part. Commodities database manager 304 organizes, sorts, and/or ranks commodity part cost data to generate cost analysis tables 306.

Cost analysis tables 306 include, but are not limited to, one or more tables having cost analysis data organized and ranked according to the type of data. For example, a cost analysis table can present data regarding the part number for all the subparts in a given part. Another cost analysis table can provide the cost for repairing a given part over a given time span, such as the repair cost for the given part during the past five (5) years.

Cost analysis tables 306 are presented to a user on a display screen. In this example, one or more tables in cost analysis tables 306 are presented to a user in a point and click type of user display. A user can position a mouse or other control to indicate a given field in a cost analysis table displayed in a window on the display screen. In response to selecting the field, another table is presented in a new or additional window providing more detailed information regarding the selected field. For example, if a user selects a given part number in a part number table displayed in a window, a new table is displayed in another window that provides additional details regarding the given part identified by the selected part number.

However, one or more tables in cost analysis tables 306 can be displayed to a user in any known or available method or manner for presenting data to a user. For example, cost analysis tables 306 may be presented in a touch screen display. A user may select a given field in a cost analysis table by touching a portion of the touch screen corresponding to the desired field to display a new table providing more detailed information regarding the selected field. For example, if a cost analysis table displays costs for a given part over a five year period, a user can select a given year within the five year period to display another cost analysis table providing more detailed information regarding the part costs for the selected year.

In these illustrative examples, cost analysis tables 306 are stored in data storage device 308. Data storage device 308 is any type of known or available device for storing data, including but not limited to, random access memory (RAM), non-volatile random access memory (NVRAM), read only memory (ROM), main memory, cache, a hard disk, a secondary storage device, such as a flash memory or floppy disk, or any other type of data storage device. In the depicted example, data storage device 308 is a local data storage device located on, or in association with, computer 300. However, data storage device 308 can also include one or more remote data storage devices located on one or more remote computers.

Cost analysis tables 306 include cost analysis data that is obtained from one or more data sources, such as data sources 310. Cost analysis data may be data regarding the cost to maintain, repair, replace, redesign, and/or any other data regarding the cost of a given part or subpart. In the illustrative embodiments, data sources 310 are any currently available sources of part cost data. Data sources 310 include, for example, government, public, private, and commercial data sources. In these depicted examples, data sources 310 include, but are not limited to, visibility and management operating and support costs (VAMOSC) databases, a commodity technical manual, federal logistics (FEDLOG) database, company maintenance and repair records, and any other public, private, government, or commercial source of commodity part data.

Data sources 310 are accessed via server 312. Server 312 is any type of server, such as server 104 and 106 in FIG. 1. Server 312 can be a server on a network, such as network 102 described in FIG. 1. Computer 300 accesses server 312 via network device 314.

Network device 314 is any type of known or available network access software for allowing computer 300 to access a network. Network device 314 connects to a network connection, such as network 102 in FIG. 1. The network connection permits access to any type of network, such as a local area network (LAN), a wide area network (WAN), or the Internet.

In this example, data sources 310 are located remotely to computer 300. However, in another illustrative example, one or more data sources in data sources 310 are located on or locally to computer 300. In other words, computer 300 can access data sources located on or locally to computer 300 in addition to data sources located remotely to computer 300.

Commodities database manager 304 presents cost analysis tables 306 to a user by means of user interface 316. User interface 316 may be any type of known or available interface for providing input to computer 300, including but not limited to, a graphical user interface (GUI), a menu-driven interface, a command line interface, a touch screen interface, and/or a voice recognition system interface. In this example, user interface 316 includes a display screen for displaying one or more tables in cost analysis tables 306.

Commodity part cost data is presented to a user on the display screen. The user can select information for display using controls on user interface 316. For example, if commodities database manager 304 displays a list of main parts in a component, a user can view additional information regarding one of the main parts using a mouse or other control associated with user interface 316 to select the desired main part number. In response to the user selecting a field, commodities database manager 304 displays additional information regarding the selected main part in a new window. For example, if a user selects a main part, commodities database manager 304 could display a cost analysis table providing all subparts of the selected main part.

In this example, a single commodities cost analysis database, commodities cost analysis database 302, is shown for purposes of illustrating different features of the advantageous embodiments. However, multiple independent commodities cost analysis databases can be interconnected to meet the user's needs. A top-level screen display interconnects several commodities cost analysis databases to enable a user to track the costs and equipment health of all the desired types of equipment. This screen would use the first two-digits of the previous coding scheme to identify the major systems and subsystems with cost driver parts. The first alphanumeric character of the system commodity rank-order is also used to help navigate.

In this example, cost analysis tables 306 organize and rank cost analysis data in accordance with a keyed hierarchical coding sequence. However, cost analysis data in cost analysis tables 306 can be organized and ranked in accordance with any known or available organizing and ranking method.

In this embodiment, a cost driver subpart is not a part that is used only once in a single custom designed piece of equipment. However, in another embodiment, a cost driver subpart can include a part that is not a part of significant repair and/or replacement cost, and/or a part that is used only once in a single custom designed piece of equipment.

Figure 4A:
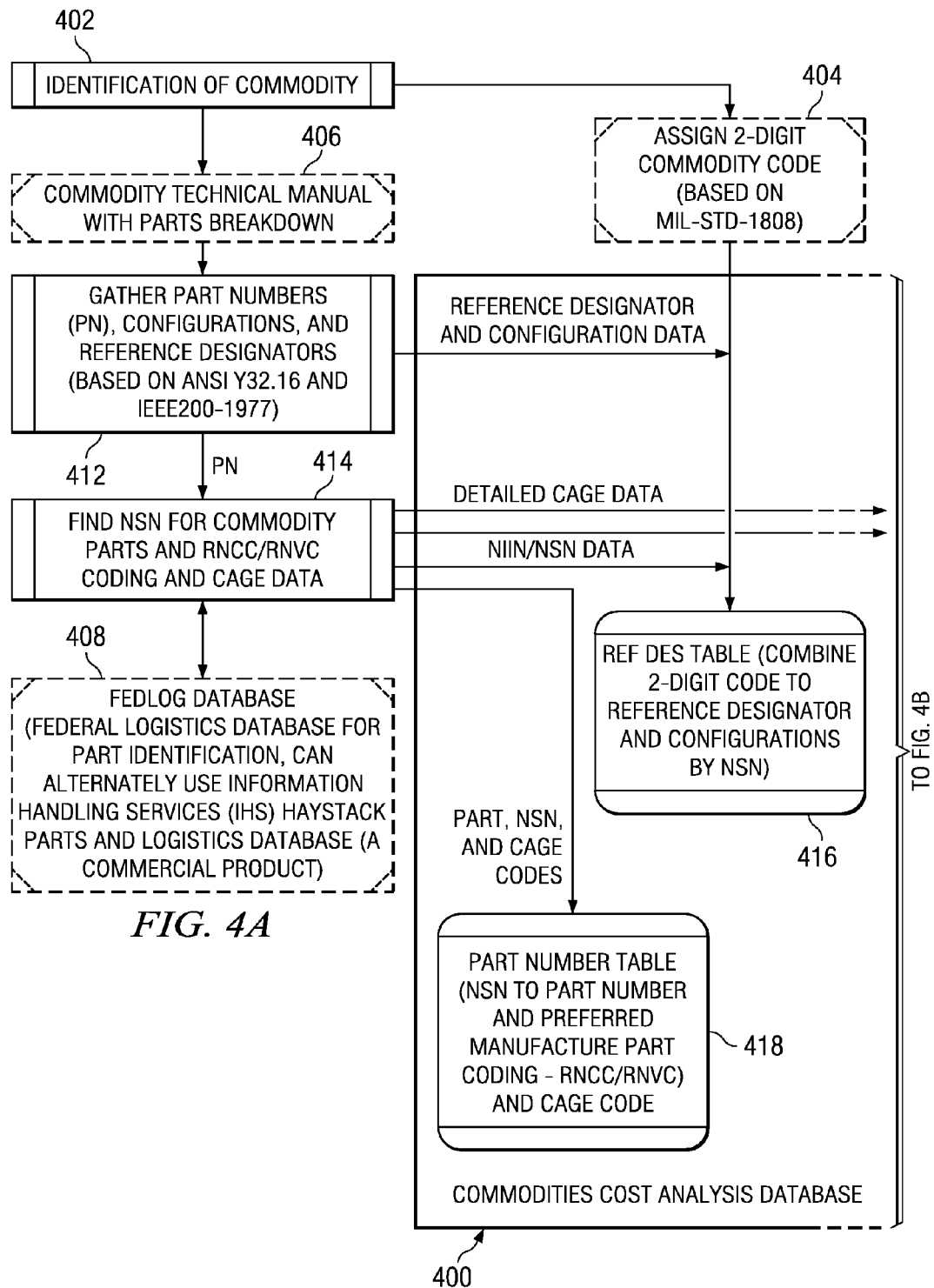
FIG. 4A is a diagram of a data flow of part data into a commodities cost analysis database in accordance with an advantageous embodiment of the present invention.
Figure 4B:
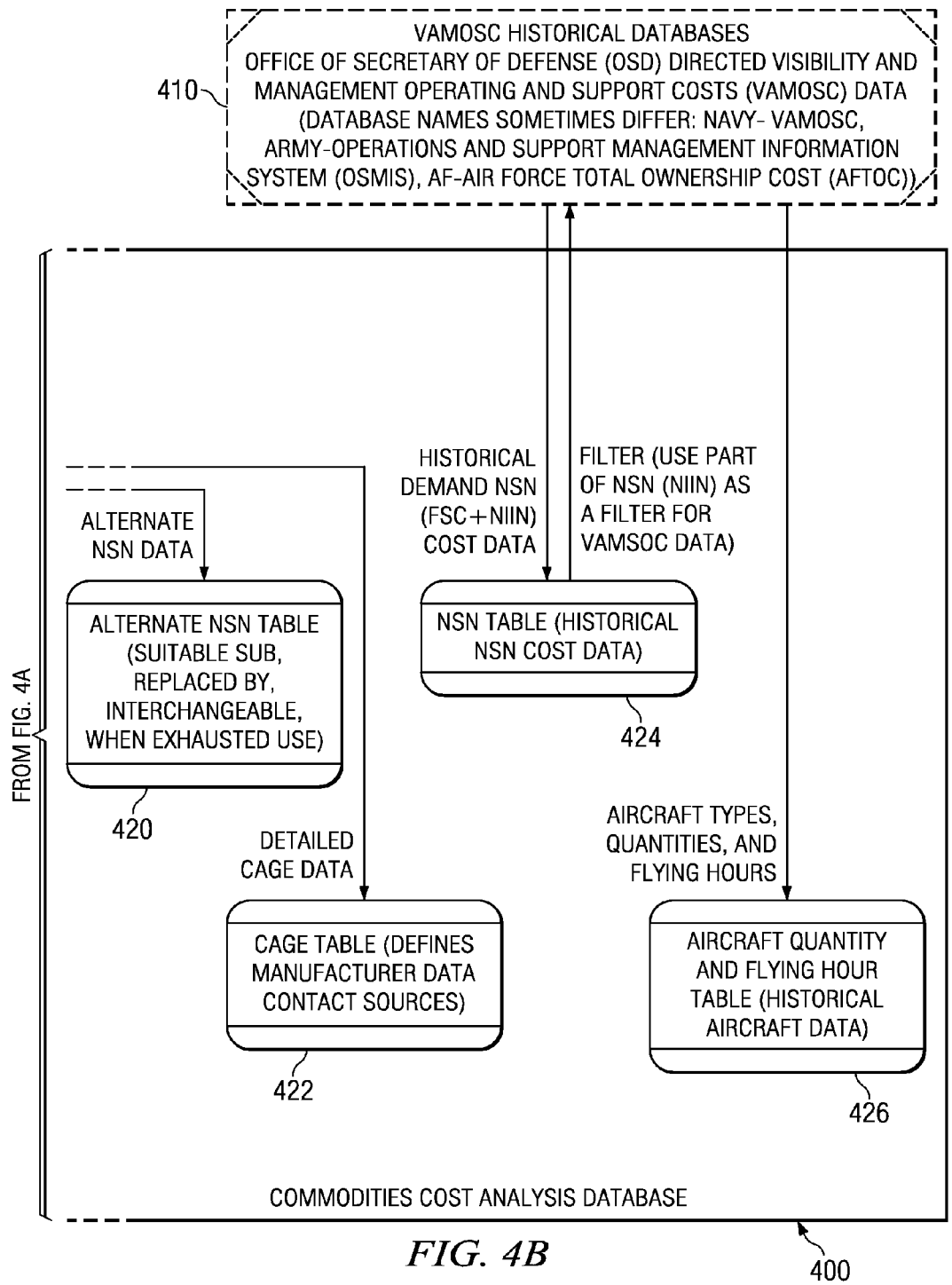
FIG. 4B is a diagram of a data flow of part data into a commodities cost analysis database in accordance with an advantageous embodiment of the present invention.

Turning now to FIGS. 4A and 4B, a diagram of a data flow of part data into a commodities cost analysis database is depicted in accordance with an advantageous embodiment of the present invention. Commodities cost analysis database 400 is a relational database for organizing, sorting, and ranking cost analysis data, such as commodities cost analysis database 302 in FIG. 3. This illustrative example includes processes performed by a user that are used as inputs and processes performed by commodities cost analysis database 400.

A user identifies a commodity based on user data gathering processes and user input (user process 402). The commodity is any type of commodity, including but not limited to, an aircraft, a car, a boat, a radio, an engine, or a radar. The user may also identify one or more parts corresponding to the commodity. The identified commodity type and/or the identified parts corresponding to the commodity may be identified based on a demand for the commodity and/or related parts. In other words, the identified commodity and parts may be directly related to re-supply demands for the commodity type and the parts. Thus, in this example, a user may identify a commodity or part that is in greater demand, for example, an part used in multiple assemblies in a plane rather than a commodity or part that is in less demand, such as a special or unique part that is used in only a single assembly.

Commodities cost analysis database 400 assigns a two-digit commodity code to the commodity (database process 404). The two-digit code identifies the type of commodity. In this example, the two-digit commodity code is generated based on MIL-STD-1808, any subsequent revisions to MIL-STD-1808, and/or any superseding data sources. MIL-STD-1808 is a U.S. military standard relating to military and commercial aircraft systems. The two-digit commodity code corresponds to a particular commodity type.

Commodities cost analysis database 400 identifies cost driver subparts corresponding to the identified commodity based on part history data obtained from a set of one or more data sources. Part history data includes part demand, part costs, and part usage. Commodities cost analysis database 400 identifies repairable cost driver subparts based on part history data for parts corresponding to the identified commodity. Commodities cost analysis database 400 identifies or filters the plurality of parts associated with a commodity to identify repairable parts because not all parts associated with a commodity are of significant cost.

Commodities cost analysis database 400 obtains part history data for parts associated with the identified commodity from a set of data sources. As used herein, a set of data sources is one or more data sources. A data source is any type of source of part-related data, including but not limited to, commercial databases, government databases, private databases, manufacturer databases, manufacturer technical manuals, public databases, and any other type of data source providing part data. In this example, the set of data sources includes data sources 406-410. Data sources 406-410 are data sources, such as data sources 310 in FIG. 3.

Data source 406 is a commodity technical manual with parts breakdown provided by a manufacturer of the identified commodity. The commodity technical manual with parts breakdown includes technical manuals and/or engineering data. Commodity technical manual with parts breakdown 406 is used to identify repairable parts. In this embodiment, all major parts, subparts, and sub-subparts use reference designators (REF DES) to identify a structured indentured parts breakdown.

Data source 408 includes a Federal Logistics database (FEDLOG) for part identification, Information Handling Services (IHS), and HAYSTACK Parts and Logistics data. Data source 410 includes Visibility and Management Operating and Support Costs (VAMOSC) data, Army Operations and Support Management Information System (OSMIS) data, and Air Force Total Ownership Cost (AFTOC) data.

In this example, data sources 406-410 include both commercial and government databases. For example, HAYSTACK is a commercial database and FEDLOG is a government database. In accordance with the illustrative embodiments, data sources 406-410 may include any commercial databases, federal databases, private databases, public databases, government databases, and/or any combination of these types of databases.

Commodities cost analysis database 400 obtains part history data from data sources 406-410 using data mining techniques to filter relevant part data from a plurality of part data. Data mining techniques include any known or available methods for data mining. Data mining includes techniques for pulling data from multiple unrelated data sources, manipulating data to produce useful indications for a user, and techniques to recognize and display previously hard to determine data relationships, such as failure rates of parts, rates of change in costs, and ranking of cost drivers in a hierarchical relationship of assemblies and parts.

In this illustrative example, commodities cost analysis database 400 obtains part cost data from data sources 406-410 by making queries to data sources 406-410. Commodities cost analysis database 400 sends search queries to one or more data sources using data mining techniques to obtain relevant part history data and part cost data for identified parts and subparts of the commodity. These queries are made using a query language. Any known or available query language can be used to query a data source, including but not limited to, structured query language (SQL). However, commodities cost analysis database 400 can obtain part cost data and/or part history data from a data source using any known or available means for requesting data from a data source.

In one embodiment, commodities cost analysis database 400 uses queries to gather part numbers (PNs), part configurations, and reference designators (REF DES) 412. However, in this example, a user gathers part numbers (PN), configurations, and reference designators (REF DES) (user process 412) and provides this information to commodities cost analysis database 400.

A reference designator (REF DES) is an identification code used to identify a given part. Nearly all manufacturers use a reference designator (REF DES) coding scheme. In fact, a reference designator (REF DES) coding scheme is required by military equipment vendors and most commercial vendors. In this example, the reference designator (REF DES) is generated based on American National Standards Institute (ANSI) Y32.16 and/or Institute of Electrical and Electronics Engineers (IEEE) 200-1977 standards or subsequent revisions or superseding data sources.

For example, in ANSI Y32.16 a subpart can be identified as "2A1R1". In this example, the "2" identifies a major part two. "2A1" identifies a first major subpart assembly "A" on major part two. In another example, the sequence "3A1A4A2", the "3" identifies major part three. The "3A1" identifies a first major subpart assembly "A" on major part three. The sequence "3A1A4" identifies the fourth subassembly "A4" on the first major subpart assembly "A1" on major part "3".

Configuration data is also available to show the parts that are used on different models produced. Configuration data also shows the reuse of parts on various models. In other words, configuration data may include data regarding the different configurations or arrangements in which a part may be used. Configuration data may include, but is not limited to, different models on which a part may be used, different models on which a part may be reused, different configurations of a part in a commodity, different configurations of a subpart within a commodity part or assembly of parts, and any other data regarding the orientation, use, configuration, disposition, or relative arrangement of a part within one or more commodities.

A user finds reference number category code (RNCC), reference number variation code (RNVC), and commercial and government entity (CAGE) data associated with each part (user process 414) and provides this information to commodities cost analysis database 400. RNCC and RNVC are preferred parts coding. CAGE provides manufacturer codes for parts. Thus, in this example, commodities cost analysis database 400 receives the national stock number (NSN) for each commodity part using the parts breakdown from data source 406. In this manner, commodities cost analysis database 400 obtains part numbers, reference designators (REF DES), and configuration data for the identified commodity.

Commodities cost analysis database 400 generates a keyed hierarchical breakdown coding sequence for each cost driver subpart of a commodity. The keyed hierarchical breakdown coding sequence provides a code to identify each part and subpart in a hierarchical fashion. The keyed hierarchical breakdown coding sequence also identifies the interrelationships of parts. For example, all subparts that are included in the passenger seat assembly include a common code to identify the passenger seat assembly subpart. Thus, the keyed hierarchical coding sequence for a head rest and seat cushions for a passenger seat assembly include a common code sequence identifying subparts of the passenger seat assembly. In this manner, the keyed hierarchical coding sequence identifies subparts and links them to the next higher assembly to which the subparts belong.

Commodities cost analysis database 400 combines MIL-STD-1808 and ANSI Y32.16 schemas, or subsequent revisions to those schemas, using a series of alpha-numeric digits to form the unique keyed hierarchical coding sequence for each part or subpart. The keyed hierarchical breakdown coding sequence begins with a two-digit commodities code to identify a given commodity. A two-digit commodities code identifies the type of commodity, as shown in FIG. 5. For example, in the sequence "61A1W3", the two-digit commodity code "61" refers to high frequency communications, as shown above.

The keyed coding sequence also includes a single alpha-numeric subtype equipment database entry sequence, a configuration code from the commodity manufacturer's equipment technical documentation, and an equipment and part reference designator (REF DES) from the commodity manufacturer. The keyed hierarchical breakdown coding sequence for one or more cost driver parts corresponding to the identified commodity is stored in reference designator (REF DES) table 416. The keyed hierarchical breakdown coding sequence defines the order the commodity was added to the database, part configuration applicability, part dependencies, and indentured part relationships.

For example, in the example sequence "61A1W3", the "A" is assigned to the AN/ARC-190 RADIO, a high frequency communications radio. The second alpha-numeric character is from the commodity model in the manufacturer's technical manual and not part of ANSI schema. Therefore, the second alpha-numeric character is unique to this database. In this example, the first major part is assigned a "1", the second major part is assigned a "2", and so on in an incremental manner. Revisions to the unit number are normally alpha-character based. For example, the first design is assigned an "A", the second design is assigned a "B", and so on. However, in this example, commodities cost analysis database 400 only uses the joining alpha-numeric code. The remaining coding for the sequence comes from a technical manual. For example, in the sequence "61A1W3", the sequence represents the following:

61-High frequency communications
A-AN/ARC-190 RADIO
1-First major part of the AN/ARC-190 RADIO
W-Model W, defined in the technical manual as Radio Receiver Transmitter RT-1341(V)8/ARC-190
3-Amplifier subassembly identified as a "3" assembly in the technical manual.

Thus, commodities cost analysis database 400 generates the keyed hierarchical breakdown coding sequence to identify each part in a commodity. In one embodiment, the keyed hierarchical breakdown coding sequence includes a two-digit commodity code identifying the commodity type, a single alpha-numeric subtype equipment database entry sequence, a configuration code from a commodity technical manual for the commodity, and an equipment and part reference designator (REF DES) from a commodity manufacturer.

Commodities cost analysis database 400 uses the national stock number (NSN), part number (PN), CAGE code, and preferred manufacturer part coding to generate part number (PN) table 418. Part number (PN) table 418 consists of NSN, CAGE code, part number (PN), RNCC and RNVC. Part number (PN) table 418 data enables a user to know the part number (PN) and CAGE code of vendor parts related to a selected part of an identified commodity. The RNCC and RNVC codes assigned to the part identify the validity of the vendor source part.

Commodities cost analysis database 400 uses alternate national stock number (NSN) data to generate alternate NSN table 420. Alternate NSN table 420 provides data regarding suitable substitute parts, interchangeable parts, information regarding parts replaced by other parts, and information regarding when use of a particular part is exhausted. In other words, alternate NSN table 420 consists of NSN, alternate NSN, Suitable_Sub, Replaced_By, Interchangeable_With, WhenExhausted_Use. Data for NSN table 420 comes from a data source, such as FEDLOG and HAYSTACK 408.

Commodities cost analysis database 400 generates CAGE table 422 based on detailed CAGE data for each commodity and/or part. CAGE table 422 defines manufacturer data and manufacturer contact information. In these examples, CAGE table 422 consists of CAGE, company name, street address, P.O. box, city, state, county, zip code, telephone, and fax number. Data for this table comes from FEDLOG and HAYSTACK 408, or any other data source.

Commodities cost analysis database 400 also generates NSN table 424 based on historical demand for parts by national stock number (NSN) cost data. NSN table 424 provides information regarding historical NSN cost data for one or more parts. Commodities cost analysis database 400 will use the last nine (9) digits of the national stock number (NSN), referred to herein as the national item identification number (NIIN), as a filter to query VAMOSC historical databases 410 to produce a record listing of four-digit federal supply class (FSC) and nine-digit NIIN. In other words, the NIIN is used as a filter to obtain part data, such as sales quantity, total credit quantity, standard price, total credit cost, and net cost from government data sources.

Finally, aircraft quantity and flying hour table 426 is a table providing information regarding the operational hours during which each part is used. Aircraft quantity and flying hour table 426 provides information regarding aircraft types, quantities of each part used, and flying hours during which each part is used. Commodities cost analysis database 400 obtains this data by filtering for MDS_SRD, which identifies the aircraft. Commodities cost analysis database 400 also filters part data using the AFTOC data flight hours and aircraft quantities using the commodity. Commodities cost analysis database 400 uses this data to calculate minimum and maximum failure rates for parts when determining future costs.

In another embodiment, the commodity is a non-aircraft commodity. In this case, commodities cost analysis database 400 uses operating hours and equipment type on which the part is installed instead of flight hours and aircraft type.

In an alternative embodiment, if a commodity is not an aircraft-related commodity, aircraft quantity and flying hour table 426 provides information regarding types of commodity or equipment the part is used within, the number of the part that is used, and the operational hours during which the part is in use.

In this manner, commodities cost analysis database 400 is populated with cost-related failure data for a commodity and all inherit configurations from maintenance and supply support databases to produce maintenance histories in an easy to read and understanding format for examining equipment health. Commodities cost analysis database 400 ranks identified parts based on cost from highest to lowest cost. In this manner, commodities cost analysis database 400 supports cost reduction initiatives.

In this illustrative example, the commodity is an aircraft type commodity. However, in accordance with an illustrative embodiment, commodities cost analysis database 400 can provide cost analysis data for any commodity that has available part cost history data.

Turning now to FIG. 5, an exemplary two-digit commodities code table is shown in accordance with an advantageous embodiment of the present invention. Table 500 is a sample list of two-digit codes based on the MIL-STD-1808 assigned to a commodity based on the type of commodity. The two-digit code identifies the type of commodity. The two-digit commodity code is generated based on MIL-STD-1808, subsequent revisions of the MIL-STD-1808, and/or any superseding data sources. MIL-STD-1808 is a U.S. military standard relating to military and commercial aircraft systems. For example, in the part identification sequence "61A1W3", the "61" is a two-digit commodity code that indicates the part is included in a commodity type identified as high frequency (HF) communications as shown at line 502.

Figure 6:
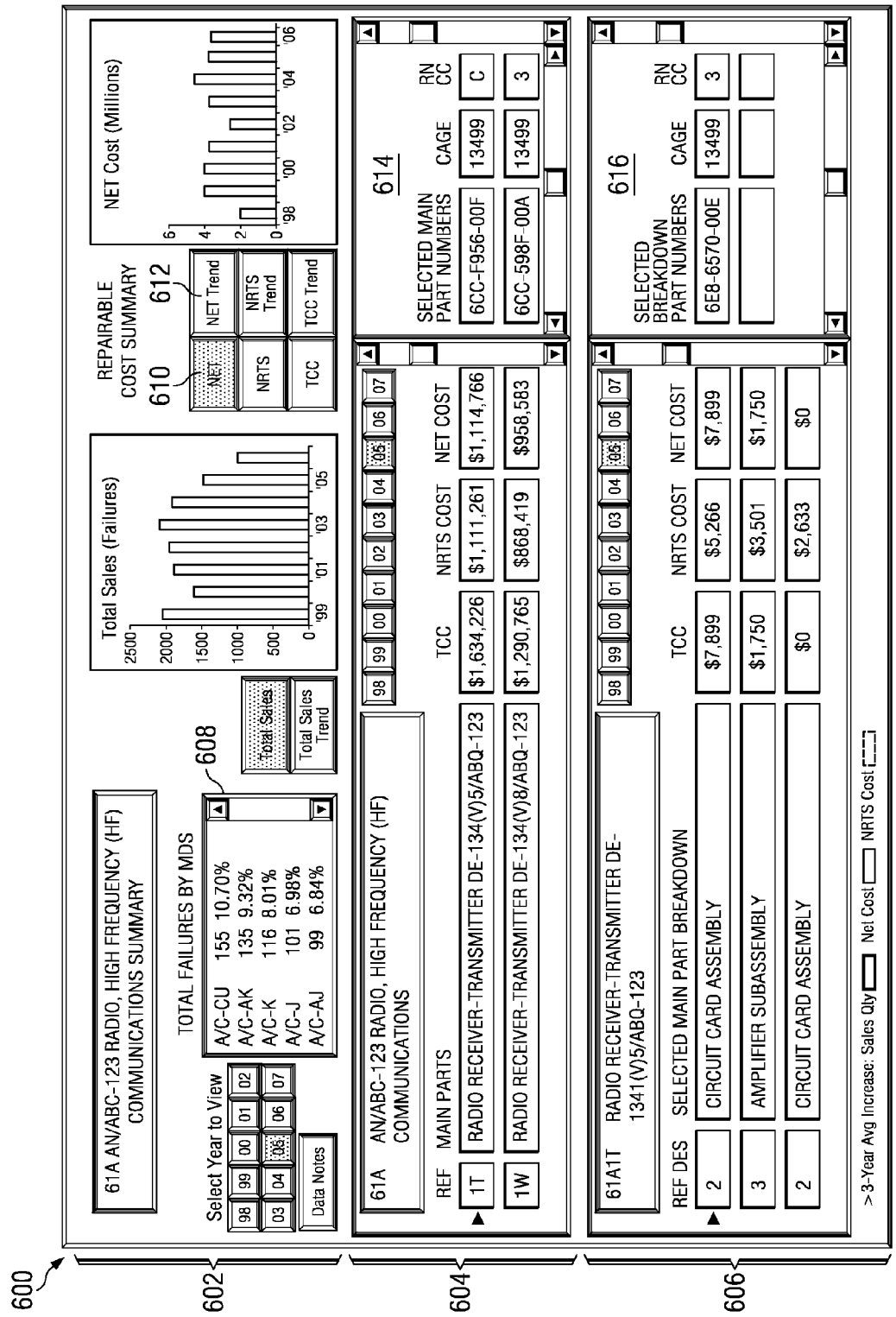
FIG. 6 is a diagram of a commodity form screen in accordance with an advantageous embodiment of the present invention.

FIG. 6 is a diagram of a commodity form screen in accordance with an advantageous embodiment of the present invention. The commodities cost analysis database consists of commodity screens and part form screens. The commodity screen and part forms screen have many sub-screen indicators, fields, and controls that enable the user to identify the cost drivers that affect the equipment health of the commodity contained in the database.

In this example, commodity form screen 600 contains summary 602, main parts 604, and selected main part breakdown 606. Summary 602 shows information such as, the commodity types and graphs of the quantities of past failures, the quantity failure trends, and other graphs of the historical costs indicator types and trends that indicate past and probable future costs attributable to cost driver parts. These indicators enable a user to judge the overall equipment health of the commodity in the past and probable future. In this example, the commodity type is an aircraft type. However, in accordance with the illustrative embodiments, the commodity type can include any non-aircraft type, such as a boat, car, truck, or any other non-aircraft equipment having repairable parts.

Total failure by mission design series (MDS) 608 displays a yearly failure summary of each year failure by aircraft mission design series, the quantity of failures, and total failure percentage of the total failures. In this example, failures are sorted in descending order from the highest mission design series failure number to the lowest. This enables users to weigh the cost to the type of equipment that had the commodity failure. However, failures can be sorted by any other known or available method, such as sorting in ascending order from lowest to highest, or by any other method.

Users can select a repairable cost summary field to display a more detailed summary of repairable costs. For example, if a user selects net control 610, the commodities cost analysis database will display a screen showing net repairable costs. Likewise, if a user selects net trend control 612, commodities cost analysis database will display a screen showing net trends for repairable costs.

Figures 7, 8:
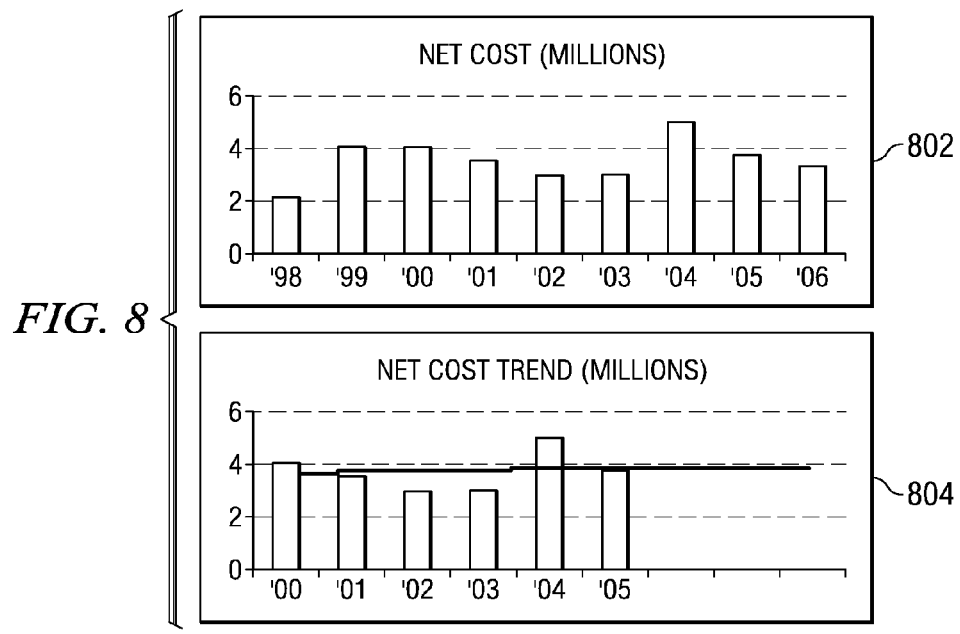
FIG. 7 is a diagram of failures by mission design series (MDS) in accordance with an advantageous embodiment of the present invention.
FIG. 8 is a diagram of a set of summary graphs for commodities' sales and repair costs in accordance with an advantageous embodiment of the present invention.

Users can select any year to display the failures and may see the sort order change if other equipment has different amounts of failures over different years. Double clicking on an equipment type results in a failed part detailed display listing being displayed in a new window, as shown in FIG. 7, below.

Selected main part numbers 614 is a display showing manufacturer part numbers for a selected part. In this example, selected main part numbers 614 is displayed to the right of main part 604. However, selected main part numbers 614 can be displayed in any location in a display screen.

Selected breakdown part numbers 616 is a listing of manufacturer part numbers for a selected component part in selected main part numbers 614. Double clicking on a selected main part breakdown field, CAGE field, RNCC field, or RNVC field triggers commodities cost analysis database to open a window or screen for a user to view or enter data.

The selected main part on main part 604 has a breakdown listing of subparts 606. Each subpart has a corresponding selected breakdown number list 616. When users select a different main part, the corresponding subparts and associated parts appear in selected main parts breakdown 606. When users select a subpart, the corresponding part numbers field, CAGE field, RNCC field, and RNCC fields 616 appear.

Referring now to FIG. 7, a diagram of failures by mission design series (MDS) is shown in accordance with an advantageous embodiment of the present invention. Detailed display listing 700 is displayed in response to a user selecting an equipment type in a commodity form summary for total failures, such as total failures by MDS 608 in FIG. 6.

Detailed display listing 700 provides information such as MDS, NSN, nomenclature, and/or number of failures for a given time period. Nomenclature is a human readable description for a given part. For example, "receiver-transmitter" is a nomenclature for a given failed part. In this example, the receiver-transmitter failed eighty-three times in the year 2005 for the MDS named A/C-CU. Detailed display listing 700 is displayed in response to a user selecting a field for total failures by MDS, such as total failures by MDS 608 in FIG. 6.

FIG. 8 is a diagram of a set of summary graphs for commodities sales and repair costs in accordance with an advantageous embodiment of the present invention. A summary graph, such as net cost graph 802 is displayed in response to a user selecting an indicator on a commodity form summary, such as net control 610 in FIG. 6. Net cost graph 802 is a graph showing a summary of net costs over a given time period. Net cost is an amount paid for all commodity repairs less credits from organizational (local) and depot-level (non-local) repairs. Negative values are not graphed.

Net cost trend graph 804 shows a summary of net costs by trend. Net cost trend is an amount paid for all commodity repairs less credits from repairs for previous years, not considering the current "partial year". A log function projects future costs. Negative values are not graphed. In this example, net cost trend graph 804 is displayed in response to a user selecting a net trend control in a commodity form screen, such as net trend control 612 in FIG. 6.

In another illustrative embodiment, a user can select to display summary graphs for total sales, total sales trend, NRTS cost, NRTS cost trend, total charge cost (TCC), and total charge cost trend (not shown). A total sales summary graph is a graph showing a quantity of all commodities needed for the years shown in the graph. A total sales trend graph is a graph showing all commodity quantities needed for previous full years, not considering the current "partial year". A log function projects future costs. Negative values are not graphed.

A not-repaired at this station (NRTS) graph shows amounts paid for all commodities depot-level repairs. Negative values are not graphed. A NRTS trend graph shows an amount paid for all commodities depot-level full year repairs, not considering the current "partial year". A log function projects future costs. In this example, negative values are not graphed.

A total charge cost (TCC) graph shows all commodities costs without credits for successful repairs. This is a peak cost activity indicator. The total charge cost (TCC) trend depicts an amount paid for all commodities without crediting for repairs. The graph projects future costs using a log function and does not consider the current "partial year". In this example, the negative values are not graphed.

FIG. 9 is a diagram of a main parts display for a selected commodity in accordance with an advantageous embodiment of the present invention. Main parts display 900 is a major part display summary on the commodity form, such as main parts display 604 in FIG. 6.

Main parts display 900 shows the equipment major part types for commodity 902 in rows with the associated total charge cost (TCC) 904, net costs paid for all commodity repairs less credits from organizational and depot-level repairs (NET) 906, and not repaired this station (NRTS) 908 costs. The order of the parts is by highest to lowest cost driver in this example. Users can select any year to display cost values and compare the main part sort ordering. Double clicking on a REF column control will open a selected main part's part form screen to show details as to all the historical and projected future part attributes.

In this example, color indicator bars 910 on the main part rows show where cost increases have occurred over the previous three (3) year average. An indicator bar is displayed along a row with a cost increase over a given time period. In this example, the time period is three years.

The color of the indicator bar can indicate which costs have increased. For example, a blue bar can indicate that sales or failures have increased, a yellow bar can indicate that the NET overall costs are increasing, and a cyan bar can indicate the NRTS costs are increasing. However, in accordance with the illustrative embodiments, an indicator of any size, shape, or color can indicate which types of costs have increased.

Historical data for selected parts and parts related to the selected parts can be used to understand what cost driver parts affected total costs and data patterns. The cost data patterns help suggest where engineering cost reduction or design improvement study needs to focus. For example, if an indicator shows that sales quantity increased greater than a three year average, this indicates that failure rates increased due to reliability decreases, or more installation and corresponding failures. If NRTS quantity is greater than a three year average or costs are greater than a three year average plus three percent, this result could indicate that increased failures sent for depot-level repairs were due to intermediate level repair inability, more installations with corresponding failures, or depot-level repairable reliability has decreased if corresponding sales increased. If a net quantity is greater than a three year average or costs are greater than a three year average plus three percent increase, this could indicate the difference between sales and credits that are increasing in quantity and/or cost.

As an additional example, if an exchange price quantity is greater than a three year average plus three percent, this could indicate that the general repair costs are increasing at a greater rate than normal. Likewise, if a total charge cost is greater than a three year average plus three percent increase, this could indicate that peak activity repair costs have increased greater than expected. In this example, costs not colored or otherwise marked with an arrow, bar, or other indicator, are normal anticipated costs associated with repairs.

FIG. 10 is a diagram of a listing of manufacturer part numbers for a selected main part in accordance with an advantageous embodiment of the present invention. Selected main part numbers display 1000 is a selected main part numbers display such as selected main part numbers display 614 in FIG. 6.

Manufacturer part numbers in selected main part numbers display 1000 are used for determining the preferred part manufacturer and related source selection order. This data helps a user to contact the manufacturer for future part reliability improvements. Selected main part numbers 1002 also help the commodities cost analysis database to group other parts manufactured by the same manufacturer that need improvements. In response to a user double clicking or otherwise selecting a main part numbers 1002 field, CAGE field, RNCC field, or RNVC field for a given part, the commodities cost analysis database opens a display that provides additional information regarding the selected field. For example, if a user selects a CAGE field, a window will open displaying CAGE code, a company name, address, P.O. box, city, state, country, zip code, telephone number and fax number for the manufacturer.

If a user selects a main part number, such as RT-AEF1(V) 5/ABC-123 1004, a window will open providing additional information regarding the selected part number, such as the window shown in FIG. 11.

FIG. 11 is a diagram of a screen providing additional information as to a field in a listing of manufacturer part numbers for a selected part in accordance with an advantageous embodiment of the present invention. In this example, a user has selected a main part number in a selected main part numbers display, such as selected main part numbers display 1000 in FIG. 10. In response to the user selection of the main part number, display 1100 changes or updates to display additional data for the selected part. In this example, the selected part number corresponds to a radio receiver-transmitter.

Figure 12:
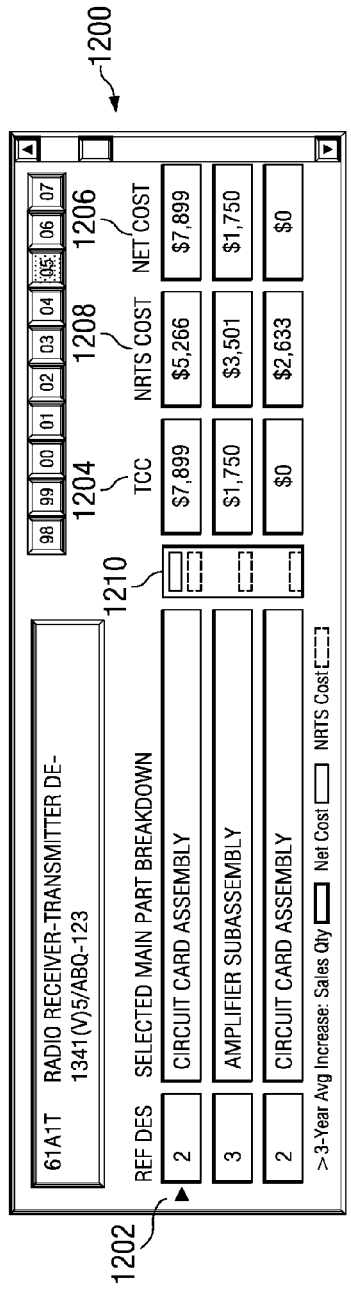
FIG. 12 is a diagram of a selected main part breakdown display screen in accordance with an advantageous embodiment of the present invention.

FIG. 12 is a diagram of a selected main part breakdown display screen in accordance with an advantageous embodiment of the present invention. Selected main part breakdown display 1200 is a selected main part breakdown display determined by the selected main part, such as main parts display 900 in FIG. 9. Selected main part breakdown display 1200 is a more detailed view of selected main part breakdown 606 in FIG. 6.

Selected main part breakdown display 1200 includes main component part types in rows, such as row 1202, with associated TCC 1204, NET 1206, and NRTS 1208 costs. The order of the parts in this example is from highest cost driver part to lowest cost driver part. However, cost driver parts may be displayed in any order.

Selected main part breakdown display 1200 includes a control for selecting a year. A user can select a year to display cost values and compare the main part sort ordering. An indicator is provided to indicate where cost increases have occurred over a previous time period. In this example, color indicator bars 1210 are provided to indicate where cost increases have occurred over a three year average. However, an indicator can be displayed as an icon of any shape, size, or color to indicate where costs have increased. In addition, the indicator can take the form of a number, letter, symbol, shape, or any other type of indicator.

Figure 13:
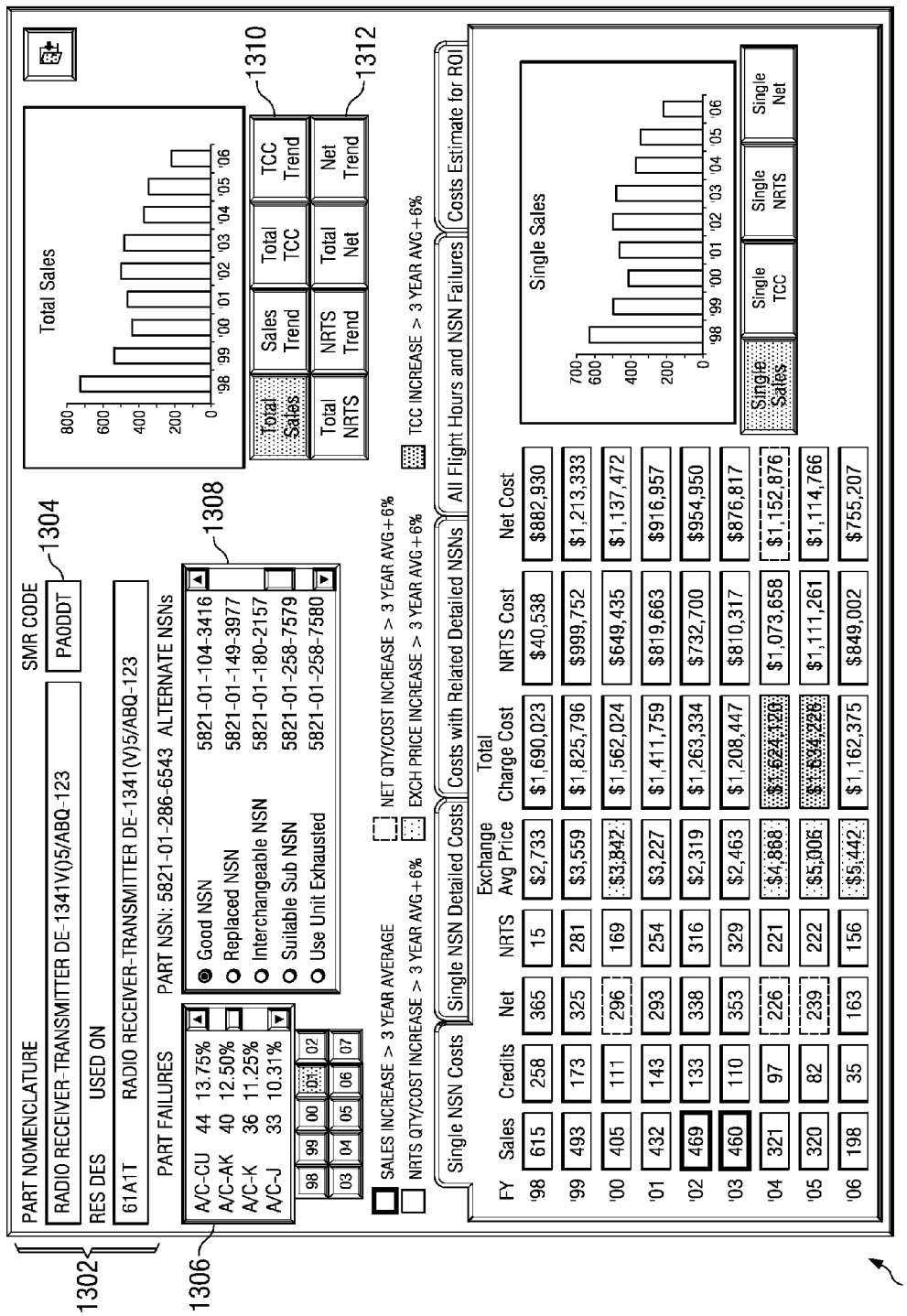
FIG. 13 is a diagram illustrating a part form screen in accordance with an advantageous embodiment of the present invention.

Referring now to FIG. 13, a diagram illustrating a part form screen is shown in accordance with an advantageous embodiment of the present invention. Part form screen 1300 provides historical failure rates and cost details necessary to assess and recommend improvements for a commodity's overall equipment health during the commodity's life cycle. The indications shown in part form screen 1300 help focus engineering design efforts to those areas where a cost effective improvement can be found. Part form screen 1300 includes summary description data 1302, graphs of historical cost data and trends, and tabular details with cost projections. The part form screen opens after a user selects the desired part REF column on the selected main part display, such as selected main parts 900 in FIG. 9. Part form screen 1302 may also be displayed in response to a user selecting a field in a part REF DES column on the selected main part breakdown, such as a REF DES field in selected main part breakdown display 1200 shown in FIG. 12.

Figure 14:
FIG. 14 is a diagram illustrating a source, maintainability, and reparability (SMR) coding description screen in accordance with an advantageous embodiment of the present invention.

Summary description data 1302 provides the part nomenclature, commodities cost analysis database reference designator (REF DES), and the next highest assemblies on which the part is installed. Summary description data 1302 also includes source, maintenance, and recoverability (SMR) code 1304. SMR 1304 defines the part authorized maintenance level. Double clicking on the SMR code triggers the commodities cost analysis database to open a screen defining what the SMR code means. An example of a screen defining an SMR code is shown in FIG. 14 below.

Part failures 1306 displays a summary of each year failure by commodity mission design series (MDS), the quantity of part failures, and the percentage of the total part failures. Part failures 1306 sorts failures in descending order from the highest MDS failure number to the lowest. This enables a user to weigh the cost to the type of equipment that experienced the part failure. Users can select any year to display part failures for the selected year. In response to a user selecting a different year, part failures 1306 may change the sort order if other equipment has different amounts of failures over other years.

Alternate parts 1308 section shows the current national stock number (NSN) for the selected part and all related NSNs. Alternate parts 1308 identifies current NSN part applicability and part availability. In this example, current NSN is marked as "GOOD", "REPLACED", "INTERCHANGEABLE", "SUITABLE SUBSTITUTE", and "USE UNTIL EXHAUSTED". A user can select a related alternate NSN field to view additional information regarding that NSN part applicability and availability. In another example, selecting an alternate NSN field changes the tabular details with projections single NSN part costs and single NSN detailed part costs. Alternate parts 1308 is useful to a user when a part replacement has occurred.

A user can select a control, such as TCC trend control 1310 and Net trend control 1312, to view a summary of various total part costs and part cost trends over time. Summary graphs are provided for total sales, sales trends, total net costs, net cost trends, total NRTS costs, and NRTS cost trends. A total sales summary graphs a quantity of selected parts and alternatives needed for the years shown. A sales trend summary graphs selected alternative part quantities needed for previous full years, not considering the current "partial year" that has not yet ended. In this example, negative quantities are not graphed.

A total net sales summary graphs an amount paid for the selected and alternative parts less credits from repairs. In this example, negative values are not graphed. A net cost trend summary graphs an amount paid for selected and alternative part repairs less credits received from previous full year repairs, not considering the current "partial year". A log function can be used to project future costs. In this example, negative values are not graphed.

A total NRTS cost summary depicts amounts paid for selected and alternative part depot-level repairs. In this example, negative values are not graphed. A NRTS cost trend graph displays an amount paid for selected and alternative part depot-level repairs, not considering the current "partial year" that has not yet ended. A log function is used to project future costs. In this example, negative values are not graphed.

A total charge cost (TCC) summary graphs an amount paid for selected and alternative part costs without credits for successful repairs. This is a peak cost activity indicator. A total charge cost trend summary graphs an amount paid for selected and alternative parts without credits for repairs. The graph projects future costs using a log function and does not consider the current "partial year". In this example, negative values are not graphed.

FIG. 14 is a diagram illustrating a source, maintainability, and reparability (SMR) coding description screen in accordance with an advantageous embodiment of the present invention. A coding definition display 1400 opens in response to a user selecting an SMR field in a part summary, such as SMR code 1304 in FIG. 13.

Figure 15:
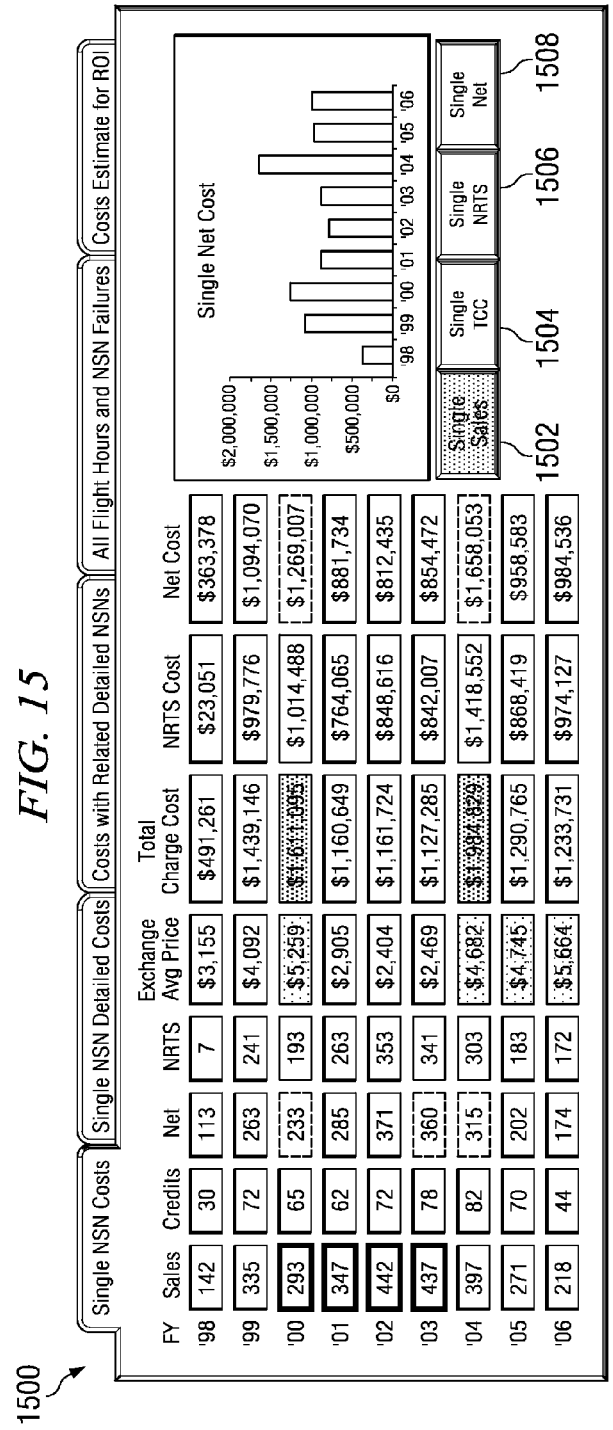
FIG. 15 is a diagram illustrating a single national stock number (NSN) part costs tab display screen in accordance with an advantageous embodiment of the present invention.

FIG. 15 is a diagram illustrating a single NSN part costs tab display screen in accordance with an advantageous embodiment of the present invention. Single NSN part costs tab 1500 shows the current part without alternative parts. When alternative parts replace existing parts, the transition between these parts is readily sent over a range of years. In this manner, the corresponding failure rates between alternate parts can easily be compared.

A user can select control 1502 to display a summary of single NSN sales. A single NSN sales summary graphs selected parts needed for the years shown. If a user selects control 1504, commodities cost analysis database displays a graph of a single TCC amount paid for selected part cost without credits for repairs over a given time period. This is a peak cost activity indicator.

Control 1506 is a select control to display a single NRTS cost summary. Single NRTS cost summary graphs amounts paid for selected part depot-level repairs. Select control 1508 can be selected to display a single net summary. Single net summary graphs amounts paid for the selected part less credits from repairs.

Figure 16:
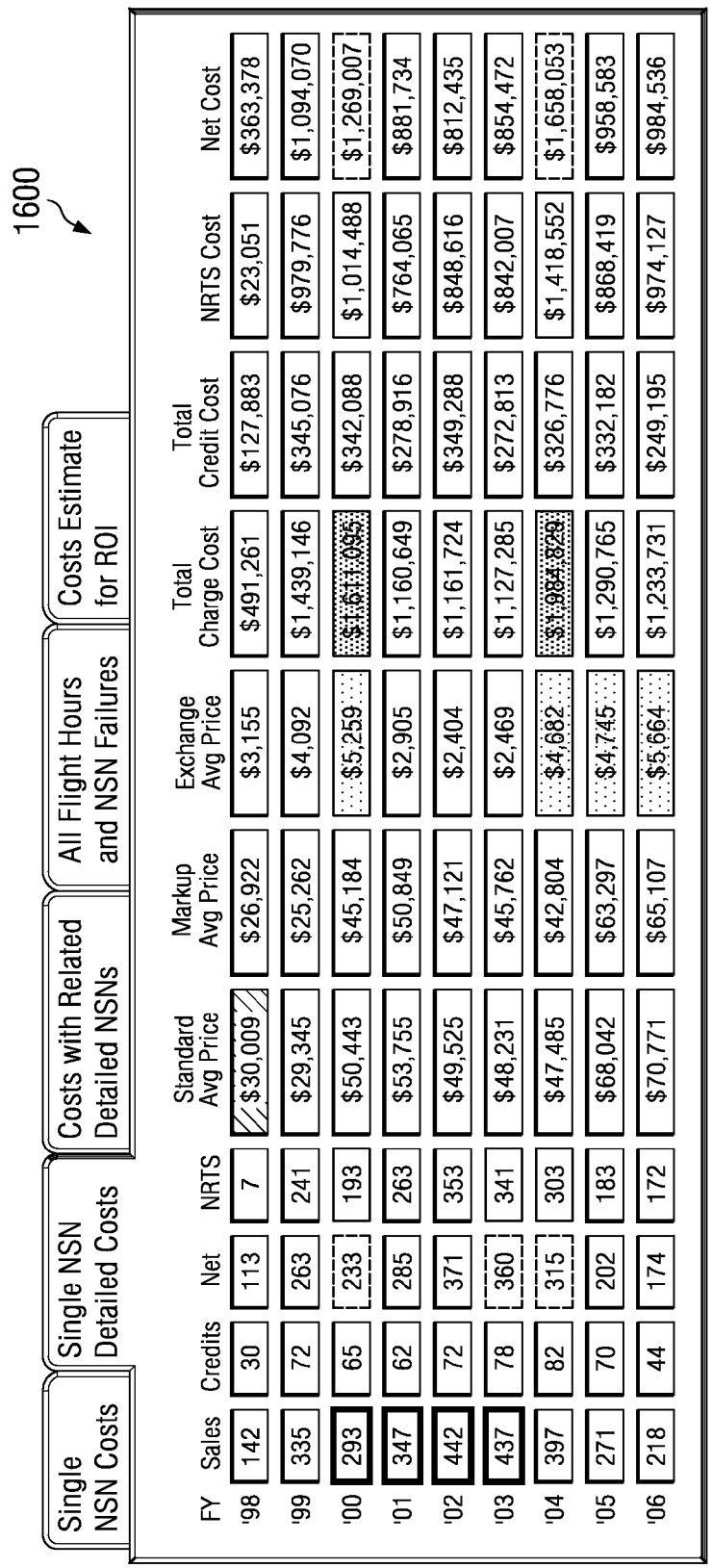
FIG. 16 is a diagram illustrating a single NSN detailed part costs tab display screen in accordance with an advantageous embodiment of the present invention.

FIG. 16 is a diagram illustrating a single NSN detailed parts cost tab display screen in accordance with an advantageous embodiment of the present invention. Single NSN detailed parts cost tab display screen 1600 provides information regarding standard average price, markup average price, and total credit cost. These additional costs help a user understand the costs involved in acquiring a new replacement part, associated overhead charges for replacing the part, and the return credit costs after repairs.

FIG. 17 is a diagram illustrating costs with related detailed NSNs tab display screen in accordance with an advantageous embodiment of the present invention. Costs with related detailed NSNs tab display screen 1700 shows standard average price, markup average price, and total credit costs for all the related and selected parts. This tab display screen helps a user to view a higher level overview of the part historical functional reliability considering all alternate parts.

Figure 18:
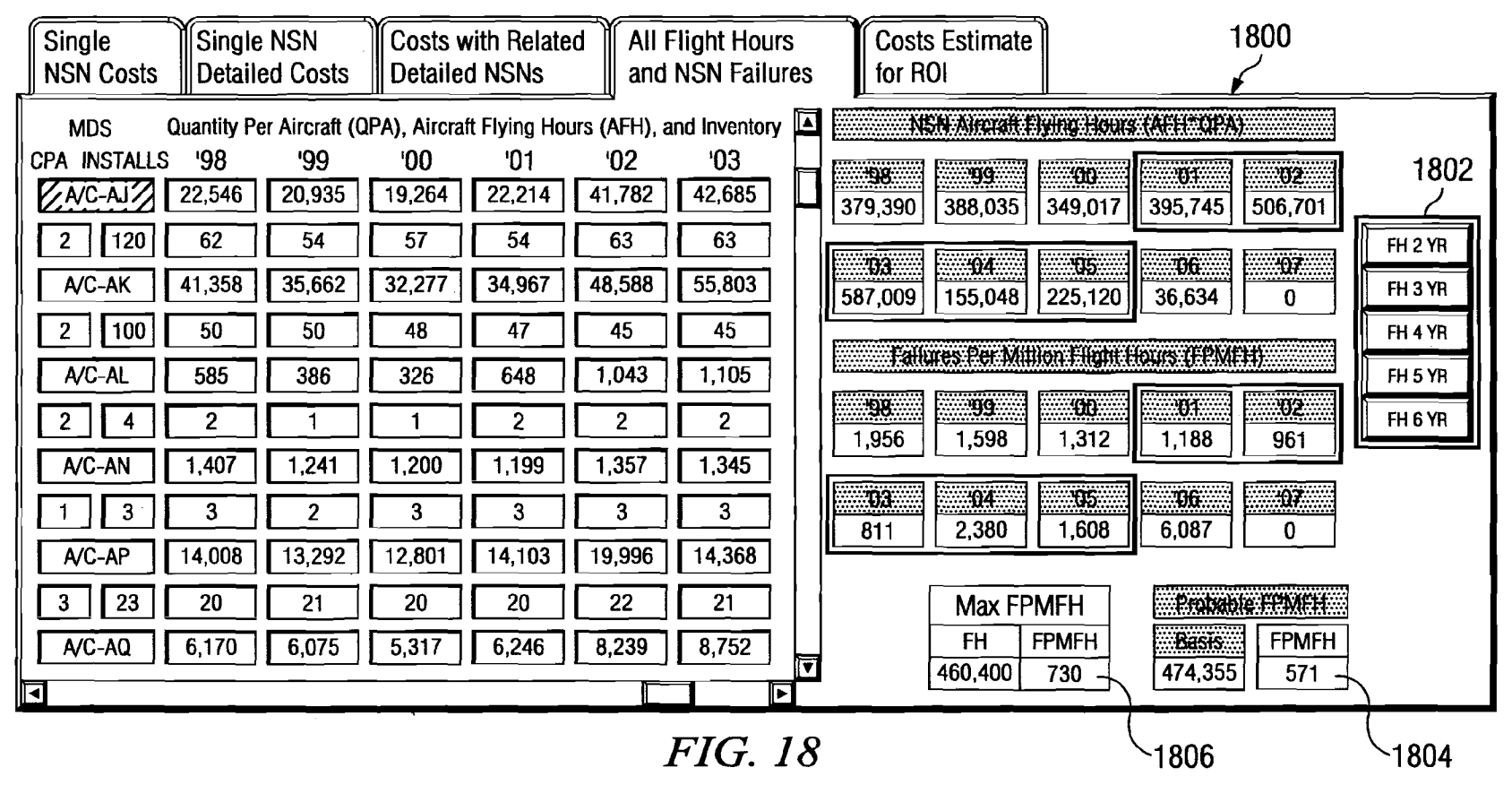

FIG. 18 is a diagram illustrating all flight hours and NSN failures tab display screen in accordance with an advantageous embodiment of the present invention. In this example, the commodity is an aircraft type commodity.

All flight hours and NSN failures 1800 shows where equipment and parts are installed based on aircraft types and historical flying hours. The commodities cost analysis database determines approximate failure rates per year based on flying hours associated with cost driver parts. The commodities cost analysis database automatically selects the year with the highest number of flying hours and calculates the suggested lowest possible failure rate 1804 for the identified parts. Users select a flying hour group of 2, 3, 4, 5 or 6 years. A user may select a group of years using any known or available means for making a selection. In this example, a user selects a group of years by pointing and clicking on a control indicating a group of years, such as controls 1802, to project the average flying hour rate based on experience over the selected group of years. This action establishes the highest failure rate values 1806. These failure rate values set the minimum and maximum reliability values for determining the range of possible reliability rates for parts used to project future costs.

Figure 19:
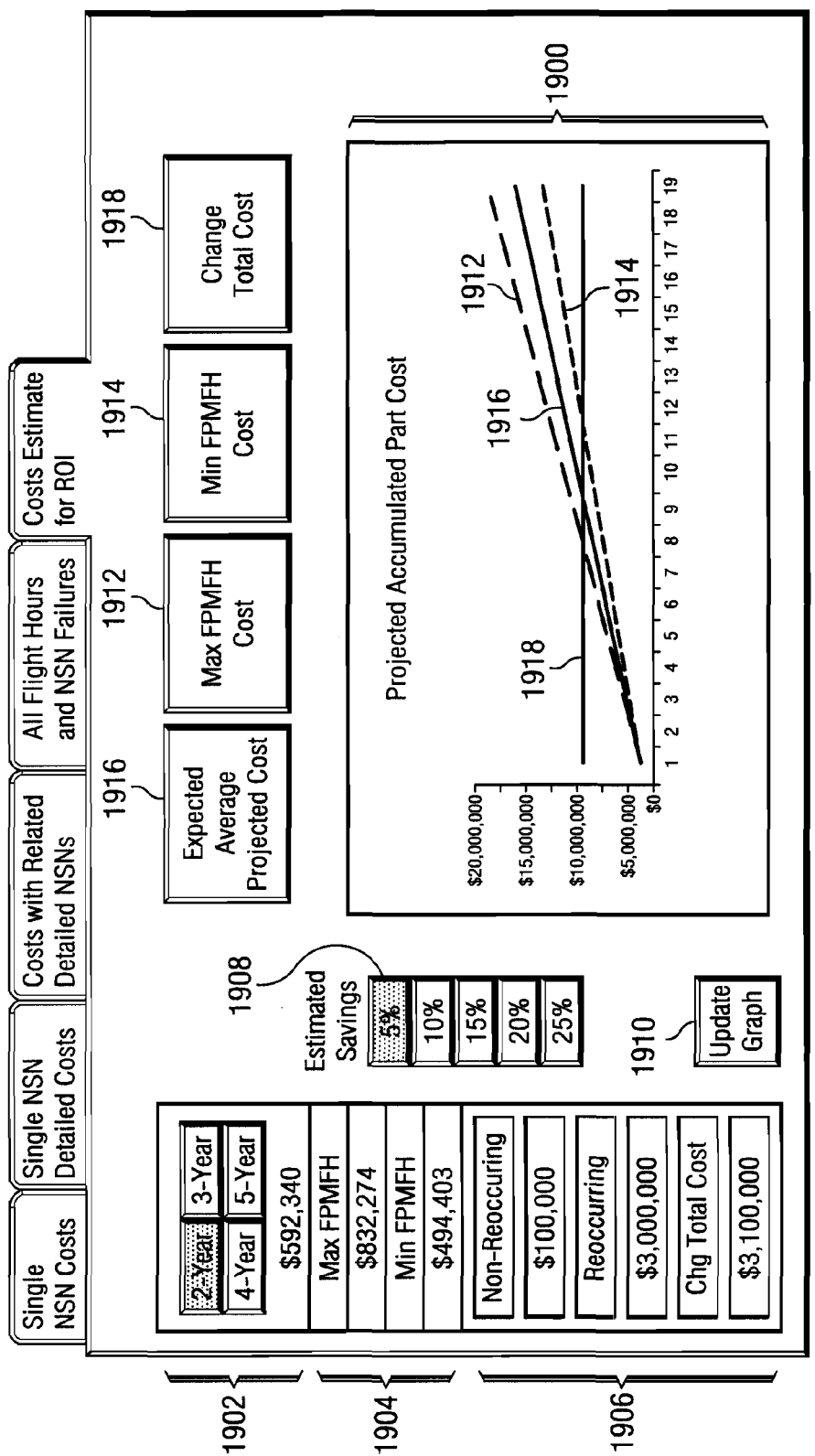
FIG. 19 is a diagram illustrating cost estimates for return on investment in accordance with an advantageous embodiment of the present invention.

Turning now to FIG. 19, a diagram illustrating cost estimates for return on investment tab display screen is shown in accordance with an advantageous embodiment of the present invention. Graph 1900 is a graph of projected future cost estimates for one or more cost driver parts. In other words, graph 1900 is a graph of projected future costs estimated based on past costs and current costs.

The projected accumulated part costs for the future are calculated based on data for failures per million operational hours for a commodity part. In this example, the commodity is an aircraft type commodity and the operating hours are flight hours during which the part is used.

The commodities cost analysis database uses the past and current sales and exchange costs for a given number of years to form a basis for the accumulated future costs. These accumulated future costs are compared with the minimum failure rate over the user selected group of years failure rate for all operating hours. For example, referring back to FIG. 18, a user selects control 1802 to select a range of years for the comparison.

The past and current cost estimates over the selected group of years for a commodity and/or an identified part enable the commodities cost analysis database to identify a range of future projected costs for the commodity and/or identified part.

A user may choose an average exchange cost and input a change in total costs to see a break-even estimate based on the engineering implementation cost estimates shown in graph 1900. As used herein, the exchange price is the cost of exchanging a bad part for a replacement part. The exchange part cost may vary widely. A user selects the average sales and exchange price by selecting a control in the display, such as average sales and exchange price 1902. A user can select an average total exchange cost for any given previous time period. For example, a user can select an average total exchange cost for the previous two, three, four, or five years. Selection of an average sales and exchange price sets the accumulated cost basis for the graph trend. This trend is the expected accumulated cost for the part.

The database uses the average sales and exchange price with the maximum failure rate and minimum selected failure rate. The maximum failure rate and the minimum failure rate may be selected by a user by indicating a group of years for averaging failure data to determine the maximum and/or minimum failure rates. Referring back to FIG. 18 for example, a user selects a control indicating a group of years 1802 to identify a minimum database selected failure rate 1804 and/or a maximum failure rate 1806 projected to occur over the selected group of years.

The database computes the minimum and maximum costs shown in 1904 on FIG. 19. In the example shown in FIG. 19, the minimum failures per million flight hours (FPMFH) cost is determined by the commodities cost analysis database. The maximum failures per million flight hours (FPMFH) cost is determined based on an average for a user selected time period. These values are multiplied by the user selected exchange and sales price to form a minimum and maximum cost basis.

Non-reoccurring and reoccurring costs 1906 hold user input engineering estimates for non-reoccurring development costs and reoccurring production costs for changes to commodity part or subparts. A user can also set the expected reliability improvement that non-reoccurring and reoccurring costs will generate as a percentage by selecting a percentage control, such as control 1908. For example, if the user selects a range of five to twenty-five percent as an estimated reliability improvement and then selects update graph button 1910, the graph displays projected costs 1900.

Graph line 1912-1916 show the expected costs of the unchanged part in future years. If a part improvement is made, graph lines 1912-1916 also show where the investment improvement costs break-even. The number scale 1-19 indicates that projected future costs estimated over a span of nineteen future years after the improvement is installed. Dotted graph line 1912 shows the estimated maximum costs based on user selected highest estimated costs. Dotted graph line 1914 shows the estimated minimum costs of the part in future years. Solid graph line 1916 shows the projected normal costs based on current failure rate costs. In summary, graph line 1912 shows the maximum accumulated costs for an unchanged part, graph line 1914 shows the minimum accumulated costs for an unchanged part, and graph line 1916 demonstrates the normal projected accumulated costs for an unchanged part.

Solid graph line 1918 shows the new part implementation costs from engineering non-recurring and reoccurring cost estimates. Where this horizontal line intersects the other three lines is the point where a return on investment occurs. A return on investment occurs at the point in future years where the part improvement cost breaks even or is justified. If graph line 1918 does not intersect the other graph lines 1912-1916 within nineteen years, the improvement cost is not justified. The users may determine that the intersection should be a five, seven, ten, or any other reasonable period in the future to be cost effective. The users may perform this action on any part in the database to determine the most cost effective part and fastest return on investment. The database stores the user data inputs to aid comparisons between different part improvement options.

Figure 20:
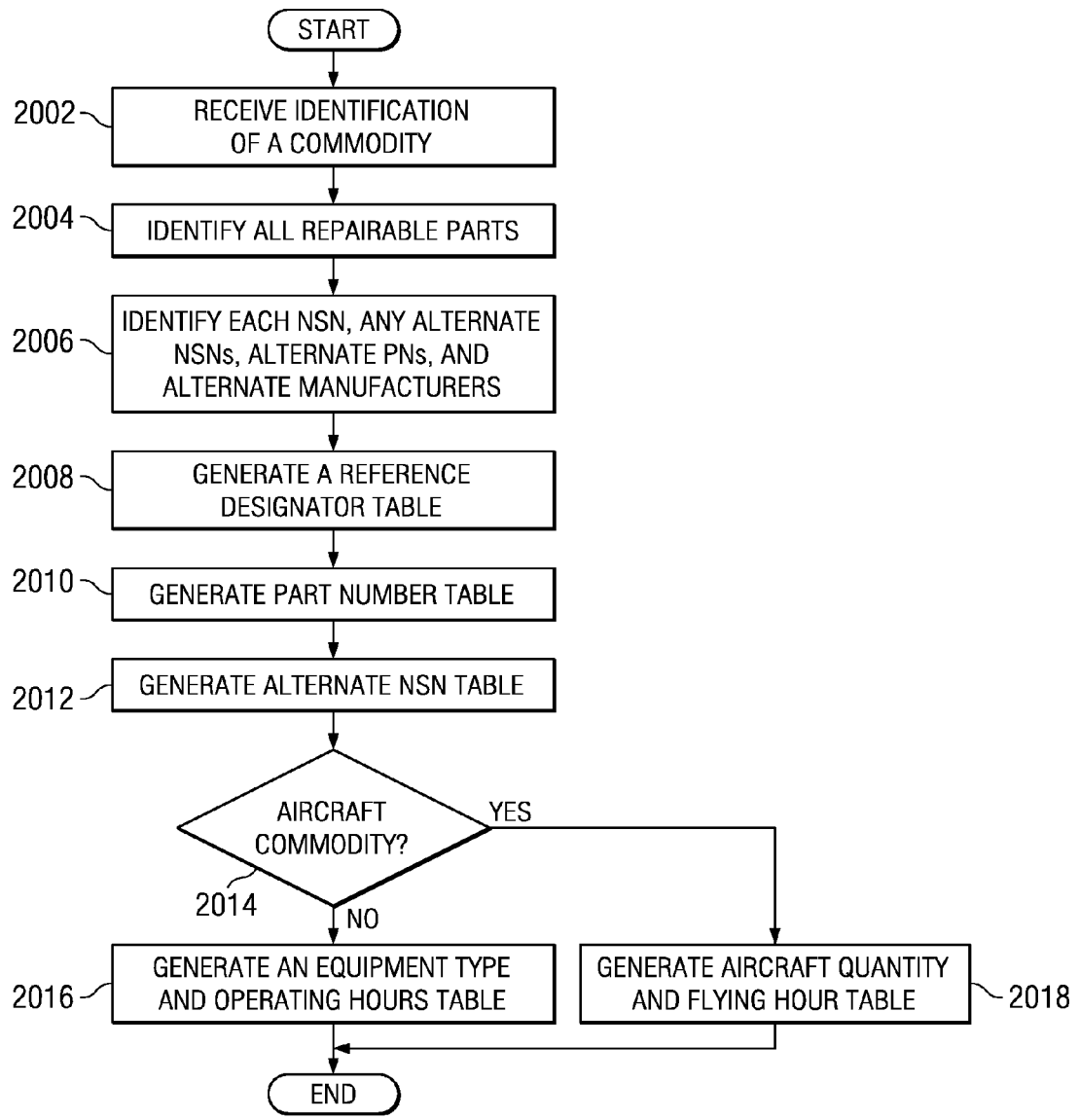
FIG. 20 is a flowchart of a process for generating a set of cost analysis data tables for an identified commodity in accordance with an advantageous embodiment of the present invention.

FIG. 20 is a flowchart of a process for generating a set of cost analysis data tables for an identified commodity in accordance with an advantageous embodiment of the present invention. In this illustrative embodiment in FIG. 20, the process is implemented by a software component for querying data sources for information, sorting and ranking the information, and generating cost analysis tables for display to a user, such as commodities database manager 304 in FIG. 3.

The process begins by receiving an identification of a given commodity from a user (operation 2002). The process identifies all repairable parts (operation 2004). The process ignores parts that are non-repairable and disposable. In other words, the commodities cost analysis database only provides part data for parts that are repairable and replaceable and not non-repairable and disposable parts.

The process identifies national stock numbers for parts of the given commodity, alternate national stock numbers for alternate parts, alternate part numbers, and alternate manufacturers (operation 2006). The process generates a reference designator (REF DES) table based on reference designator (REF DES) codes and configuration data (operation 2008). Next, the process generates a part number table (operation 2010) using part numbers and NSN codes. The process generates an alternate NSN table (operation 2012) using alternate NSN data.

The process makes a determination as to equipment type the commodity is installed or operated on (Operation 2014). If the commodity is an aircraft related commodity, the process generates an aircraft type and operating hours table (operation 2016) showing the type of equipment (aircraft) the part is installed on, and the number of hours the part is in use during equipment (aircraft) operation, with the process terminating thereafter.

If the commodity is an aircraft commodity, the process generates an aircraft quantity and flying hour table (operation 2018) providing data regarding the type of aircraft the part is installed on, quantity of the commodity part in use, and number of hours the commodity part is in use on each aircraft. Other equipment types (non-aircraft) may be used as long as the equipment quantity, equipment operating hours, and quantity of the commodity part installed on each is known, with the process terminating thereafter.

In another illustrative embodiment, the commodities cost analysis database provides commodities cost analysis data regarding other equipment types, such as non-aircraft equipment types. In this embodiment, non-aircraft equipment types include missile systems, ground support equipment, training equipment, and any other non-aircraft type equipment.

Figure 21:
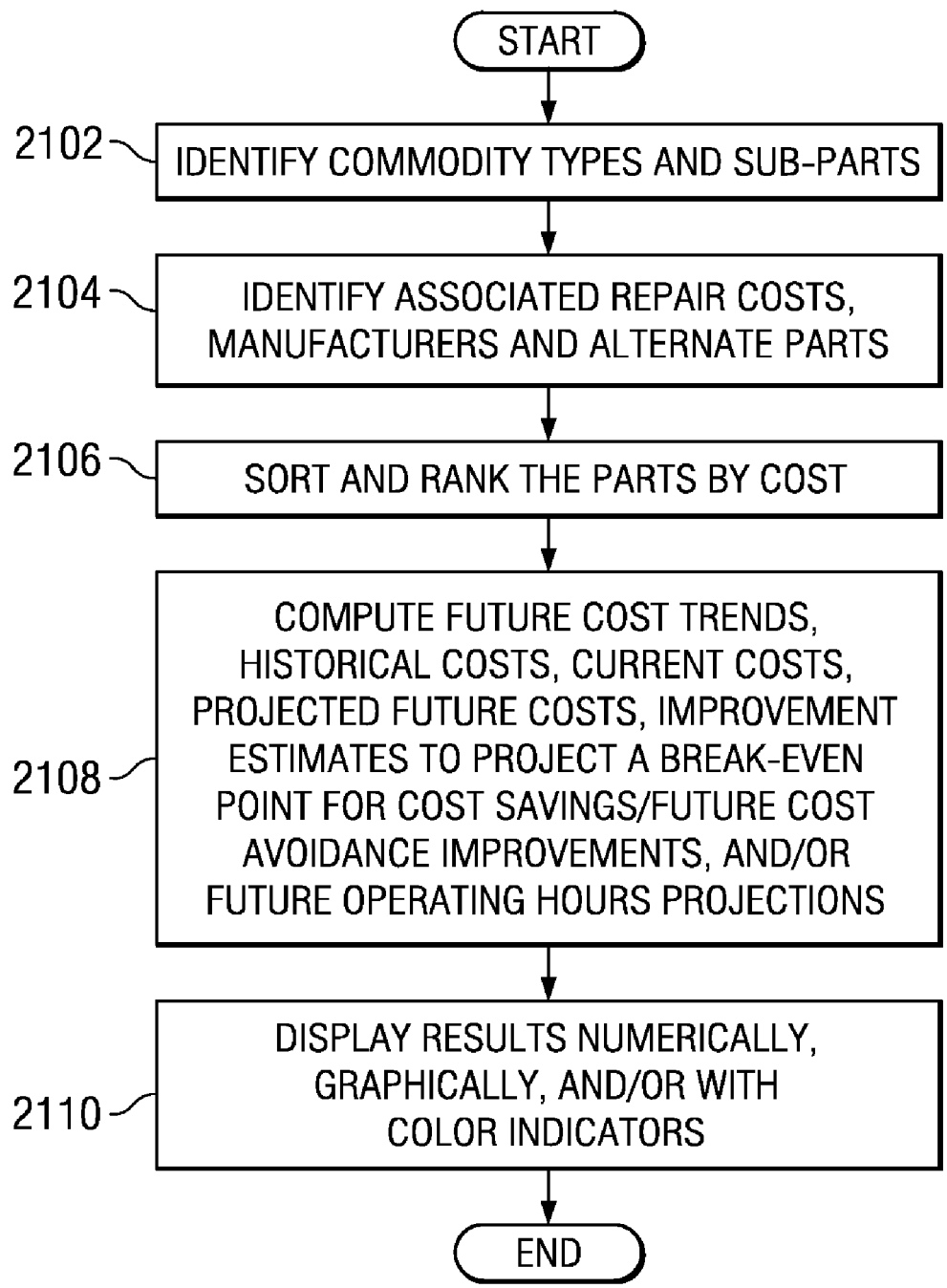
FIG. 21 is a flowchart of a process for calculating cost analysis data for a given part and displaying the cost analysis data to a user in accordance with an advantageous embodiment of the present invention.

FIG. 21 is a flowchart of a process for calculating cost analysis data for a given part and displaying the cost analysis data to a user in accordance with an advantageous embodiment of the present invention. In this illustrative embodiment in FIG. 21, the process is implemented by a software component for querying data sources for information, sorting and ranking the information, and generating cost analysis tables for display to a user, such as commodities manager 304 in FIG. 3.

The process begins by identifying a commodity and identifying subparts corresponding to the commodity (operation 2102). The identified subparts are repairable subparts that are not low-cost, and therefore disposable parts. The process identifies associated repair costs, manufacturers, and alternate parts (operation 2104) associated with the identified subparts. The process sorts and ranks the parts by cost (operation 2106). The process computes future costs trends, historical costs, current costs, projected future costs, improvement estimates to project a break-even point for cost savings/future cost avoidance improvements, and/or projections as to the number of operating hours during which identified subparts will be used (operation 2108). The process displays the results calculated in operations 2102-2108 in a display numerically, graphically, and/or with color indicators (operation 2110), with the process terminating thereafter.

In the example shown in FIG. 21, the process is implemented by a software component. However, in another embodiment, the process in FIG. 21 may be implemented by a technician or engineer.

Figure 22:
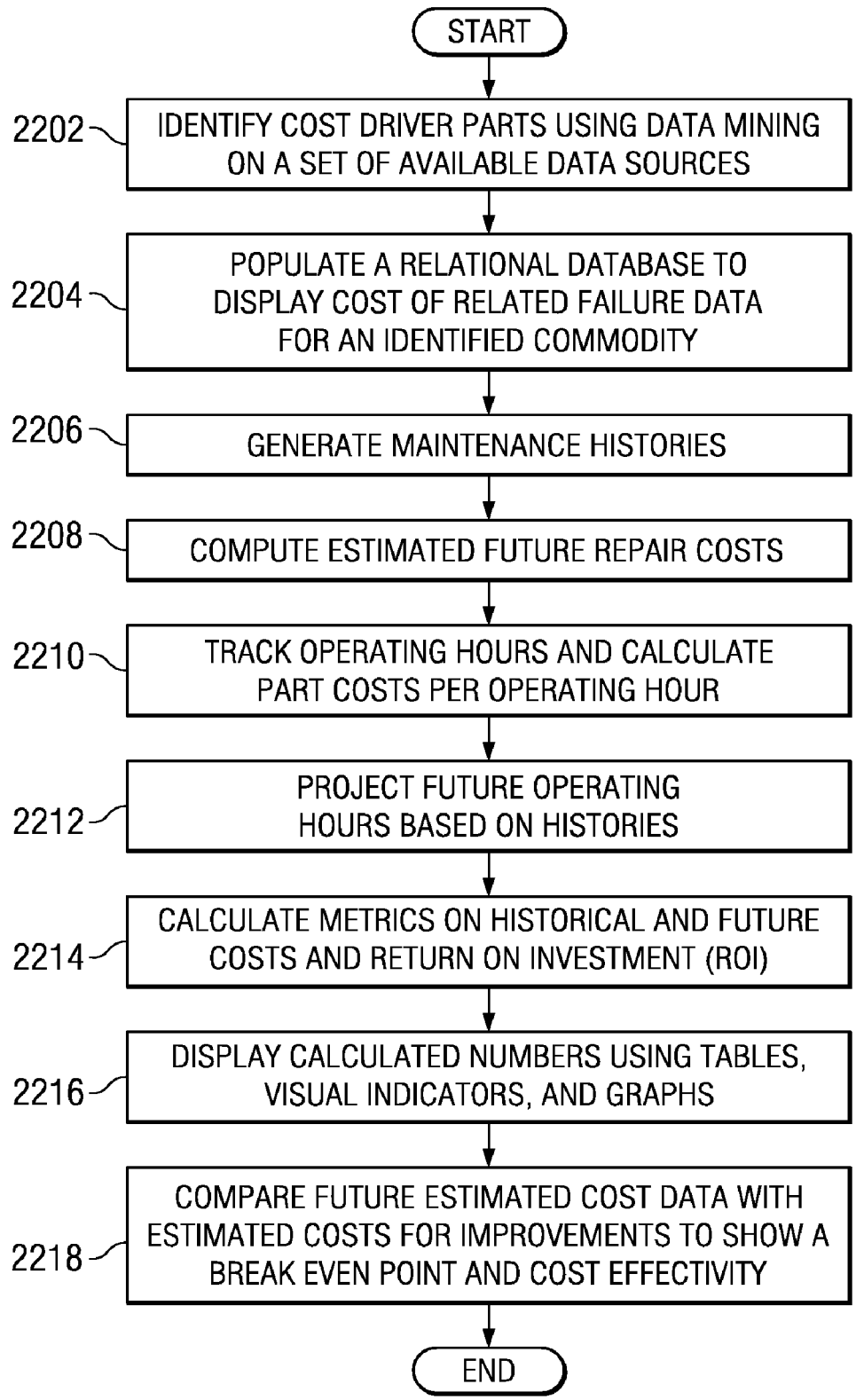
FIG. 22 is a flowchart of a process for organizing and manipulating cost analysis data for a given commodity in a commodities cost analysis database in accordance with an advantageous embodiment of the present invention.

FIG. 22 is a flowchart of a process for organizing and manipulating cost analysis data for a given commodity in a commodities cost analysis database in accordance with an advantageous embodiment of the present invention. In this illustrative embodiment in FIG. 22, the process is implemented by a software component for querying data sources for information, sorting and ranking the information, and generating cost analysis tables for display to a user, such as commodities cost analysis database 304 in FIG. 3.

The process begins by identifying cost driver parts by using data mining on a set of available data sources to obtain part cost data (operation 2202). The process populates a relational database with part cost data to display cost-related failure data for an identified commodity (operation 2204). The process generates maintenance histories for the identified cost driver parts (operation 2206). The process computes estimated future repair costs for the cost driver parts (operation 2208). The process tracks operating hours and calculates part costs per operating hour (operation 2210). The process projects future operating hours based on cost driver part histories (operation 2212).

Next, the process calculates metrics based on historical data, future costs, and projected return on investments (operation 2214). The process displays the numbers and data calculated in operations 2202-2214 using tables, visual indicators, and/or graphical displays (operation 2216). The process compares future estimated cost data for cost driver parts with estimated costs for improvements to show a break-even point and cost effectiveness for replacing a cost driver part and/or repairing the cost driver part (operation 2218), with the process terminating thereafter.

In the example shown in FIG. 22, the process is implemented by a software component. However, in another embodiment, the process in FIG. 22 may be implemented by a technician or engineer.

Advantageous embodiments of the present invention provide a computer implemented method and computer usable program code for a commodities cost analysis database. In one illustrative embodiment, a computer implemented method and computer program product is provided for managing a commodity and related cost drivers. The process identifies a commodity type and subparts corresponding to the commodity. The process generates part cost data for each subpart based on part data. Part data is obtained from a set of data sources using data mining techniques to filter relevant part data from a plurality of part data. The process sorts the part cost data based on a keyed hierarchical breakdown coding sequence within a relational database. The process displays a sorted set of cost analysis data in a commodity database display. A user can select fields in the commodity database display to obtain information regarding future cost trends for the commodity and associated subparts based on a demand for the commodity and a demand for the subparts.

In another illustrative embodiment, a computer implemented method for managing aircraft fleet maintenance and logistics is provided. The process identifies a set of cost driver subparts corresponding to an aircraft type commodity based on part data obtained by using data mining techniques to filter relevant part data from a plurality of data sources. The process populates a commodity database to display cost-related failure data and inherit configurations for the commodity based on maintenance and supply data from a set of data sources. The process computes an estimated future repair cost for the set of cost driver subparts in the commodity database. The commodity database is used to examine equipment health of the commodity.

The illustrative embodiments provide a vision into all related parts within a commodity, rather than only focusing on a single part cost driver. The process indicates where a given part is used in the commodity and in other configurations of the commodity. The process also identifies how often per operational hour the given part is needed and/or used. The process also supports cost avoidance initiative by using return on investment projections based on historical supply demands on a given part and alternate parts. The process identifies possible return on investment opportunities for part reliability redesign investment that will lower future cost trends and improve life cycle, or long term commodity supportability by identifying the past, present, and future projected costs of repair versus replacement or redesign of identified subparts. In addition, the process helps track the effectiveness of previous improvements. Thus, a user can focus scarce engineering resources by directing investigations into the most cost effective high-cost part driver candidates and the related equipment and part manufacturers associated with the high-cost part driver candidates.

The process uses a break-even analysis based on cost history to avoid unnecessary investigations and help justify part replacements and changes to part designs. The process also enables users to track the effectiveness of previous changes and improvements to cost driver parts.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The different embodiments can take the form of an entirely hardware embodiment, an entirely software embodiment, or an embodiment containing both hardware and software elements. In one embodiment, the features are implemented in software, which includes, but is not limited to, firmware, resident software, and microcode. For example, the features can be implemented in signal processing software modules on general purpose computers, digital signal processing (DSP) chip, field programmable gate arrays (FPA) integrated circuit, and application specific integration circuit (ASIC) chips utilizing firmware programming.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing commodities, the computer implemented method comprising:
    identifying, by a processing unit, a set of cost driver subparts corresponding to an aircraft type commodity based on part history data, wherein the part history data is obtained using data mining techniques to filter relevant part data from a set of data sources;
    generating, by the processing unit, a keyed hierarchical breakdown coding sequence for the set of cost driver subparts such that a code in the keyed hierarchical breakdown coding sequence is associated with each of the cost driver subparts and components of the each of the cost driver subparts;
    populating, by the processing unit, a commodities cost analysis database with cost-related part failure data and configuration data for the set of cost driver subparts based on maintenance and supply data from the set of data sources;
    computing, by the processing unit, estimated future repair costs for the set of cost driver subparts; and
    presenting, by the processing unit, the estimated future repair costs, cost-related part failure data, and configuration data in the commodities cost analysis database, wherein the commodities cost analysis database is used to examine equipment health of a commodity.

2. The computer implemented method of claim 1 wherein the identified set of cost driver subparts are identified based on a demand for subparts.

3. The computer implemented method of claim 1 further comprising:
    obtaining historical aircraft flying hours and part cost per flying hour for the set of cost driver subparts;
    calculating projected future flying hours based on the part history data for the set of cost driver subparts, wherein the part history data includes maintenance histories for the set of cost driver subparts; and
    presenting the historical aircraft flying hours, part costs per flying hours, and projected future flying hours in an aircraft quantity and flying hour table.

4. The computer implemented method of claim 1 further comprising:
    comparing future estimated cost data for the set of cost driver subparts with an estimated cost for improvements; and
    identifying a break-even point for repairs and replacement of cost driver subparts.

5. The computer implemented method of claim 1 further comprising:
    identifying hardware design changes to a given subpart in the set of cost driver subparts to improve equipment health of the given subpart.

6. The computer implemented method of claim 1 further comprising:
    organizing historical subpart performance data in useful and relevant groupings using on the keyed hierarchical breakdown coding sequence; and
    providing metrics on historical costs and future costs for the set of cost driver subparts based on the historical subpart performance data and projected future operating hours during which each part in the set of cost driver subparts will be used by the commodities.

7. A computer implemented method for managing commodity data, the computer implemented method comprising:
    identifying, by a processing unit, a commodity type and parts corresponding to the commodity;
    generating, by the processing unit, a keyed hierarchical breakdown coding sequence for the parts corresponding to the commodity such that a code in the keyed hierarchical breakdown coding sequence is associated with each of the parts and subparts of the each of the parts;
    generating, by the processing unit, part cost data for each part based on part history data, wherein the part history data is obtained from a set of data sources using data mining techniques to filter relevant part history data from the set of data sources;
    creating, by the processing unit, cost-related failure data using the part cost data and the keyed hierarchical breakdown coding sequence; and
    presenting, by the processing unit, a graphical display of the cost-related failure data in a commodity database based on the keyed hierarchical breakdown coding sequence, wherein information regarding future cost trends for the commodity and corresponding parts are identified using the graphical display.

8. The computer implemented method of claim 7 wherein the cost-related failure data includes at least one of part repair costs, part replacement costs, alternate part numbers, alternative part costs, and part manufacturers.

9. The computer implemented method of claim 7 wherein the cost-related failure data is displayed numerically, graphically, and with color indicators to identify a cost driver part that is a candidate for investigation to determine if changes to the cost driver part can lower long-term supportability costs of the commodity.

10. The computer implemented method of claim 7 wherein the parts are repairable items, and wherein the parts are not low-cost disposable parts.

11. The computer implemented method of claim 7 wherein the identified commodity type and the parts corresponding to the commodity are directly related to re-supply demands for the commodity type and the parts.

12. The computer implemented method of claim 7 further comprising:
generating a commodity equipment type and operating hours table indicating part quantities used in the commodity and a number of hours each part is used during operation of the commodity.

13. The computer implemented method of claim 7 further comprising:
generating a national stock number (NSN) table indicating historical costs and current costs for repair and replacement of the parts, wherein the historical costs and current costs are displayed in numeric and graphical metrics.

14. The computer implemented method of claim 7 further comprising:
generating projections for future operating hours and future demand for the parts, wherein the future operating hours identifies a projected amount of time a given part will be in use during operation of the commodity.

15. The computer implemented method of claim 7 further comprising:
generating projected future costs and improvement estimates for the parts, wherein a break-even point for a cost savings and future cost avoidance improvements are determined based on the projected future costs and improvement estimates.

16. The computer implemented method of claim 7 wherein the commodity type is an aircraft commodity type.

17. The computer implemented method of claim 7, wherein the keyed hierarchical breakdown coding sequence comprises a two-digit commodity code identifying the commodity type, an alpha-numeric subtype equipment database entry sequence, a configuration code, and an equipment and part reference designator (REF DES).

18. The computer implemented method of claim 7 further comprising:
identifying information regarding future cost trends for the commodity and corresponding parts based on at least one of a demand, a repair cost, and a part cost.

19. The computer implemented method of claim 7 further comprising:
obtaining the part history data from the set of data sources using data mining techniques to filter relevant part history data from the set of data sources, wherein part history data includes at least one of a historical demand, a part cost, and a usage data corresponding to a part.

20. A computer program product comprising:
a non-transitory computer usable medium including computer usable program code for causing a computer to implement a method for managing commodity data, said computer program product comprising:
computer usable program code for identifying a commodity type and parts corresponding to the commodity;
computer usable program code for generating a keyed hierarchical breakdown coding sequence for the parts corresponding to the commodity such that a code in the keyed hierarchical breakdown coding sequence is associated with each of the parts and subparts of the each of the parts;
computer usable program code for generating part cost data for each part based on part history data, wherein the part history data is obtained from a set of data sources using data mining techniques to filter relevant part history data from a set of data sources;
computer usable program code for creating the cost-related failure data using the part cost data and the keyed hierarchical breakdown coding sequence; and
computer usable program code for presenting a graphical display of the cost-related failure data in a commodity database based on the keyed hierarchical breakdown coding sequence, wherein information regarding future cost trends for the commodity and corresponding parts are identified using the graphical display.

* * * * *